(12) United States Patent
Nashed et al.

(10) Patent No.: US 12,031,083 B2
(45) Date of Patent: Jul. 9, 2024

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Alexander Nashed, Norderstedt (DE); Amandine Martin, Lyons (FR); Peter Janeczek, Finnentrop (DE); Simone Schaefer, Höchberg (DE); Nilanjan Sarangi, Shrewsbury, MA (US); Guangyong Lin, Shrewsbury, MA (US); Arthur Turkin, Würzburg (DE)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 78 days.

(21) Appl. No.: 17/810,335

(22) Filed: Jun. 30, 2022

(65) Prior Publication Data
US 2023/0002656 A1 Jan. 5, 2023

Related U.S. Application Data

(60) Provisional application No. 63/216,838, filed on Jun. 30, 2021.

(51) Int. Cl.
*C09K 3/14* (2006.01)
*B24D 3/28* (2006.01)
(Continued)

(52) U.S. Cl.
CPC .............. *C09K 3/1436* (2013.01); *B24D 3/28* (2013.01); *B24D 3/34* (2013.01); *B24D 18/0072* (2013.01)

(58) Field of Classification Search
CPC ........ B24D 3/28; B24D 3/34; B24D 18/0072; C09K 3/1436
See application file for complete search history.

(56) References Cited

U.S. PATENT DOCUMENTS 4,989,375 A 2/1991 Henmi et al.
6,074,278 A 6/2000 Wu et al.
(Continued)

FOREIGN PATENT DOCUMENTS

CN 113165145 * 12/2019 ............... B24D 3/28
EP 0344610 A2 12/1989
(Continued)

OTHER PUBLICATIONS

Tyrolit, Mira Ultra SF, www.tyrolit.com, last accessed Apr. 8, 2021, 2 pages.
(Continued)

*Primary Examiner* — Pegah Parvini
(74) *Attorney, Agent, or Firm* — Abel Schillinger, LLP; Arpan Ghosh

(57) ABSTRACT

An abrasive article can include a body including a first portion coupled to a second portion in a radial plane. The body can include a central opening extending in an axial direction of the body through the first portion and through the second portion. The central opening can include a circumferential surface defining an inner diameter of the body. The circumferential surface can be defined by at least a portion of the first portion and at least a portion of the second portion. The first portion can include first abrasive particles contained within a first bond material, including an inorganic material, and the second portion can include second abrasive particles contained within a second bond material, including an organic material. The organic material can include epoxy. In an embodiment, the second portion comprises an elongation-at-fracture of less than 2.7%, a Stiffness Value of at least 8.3, or a combination thereof.

20 Claims, 12 Drawing Sheets

(51) Int. Cl.
    *B24D 3/34*          (2006.01)
    *B24D 18/00*        (2006.01)

(56) References Cited

U.S. PATENT DOCUMENTS

| | | |
|---|---|---|
| 6,562,089 B1 | 5/2003 | Iwai et al. |
| 8,029,338 B2 | 10/2011 | Kumar et al. |
| 2014/0256238 A1* | 9/2014 | Van .......................... B24D 5/14 |
| | | 451/548 |
| 2015/0000206 A1 | 1/2015 | Klett et al. |
| 2019/0375073 A1 | 12/2019 | Martin et al. |

FOREIGN PATENT DOCUMENTS

| | | |
|---|---|---|
| JP | 2008012125 A | 1/2008 |
| JP | 2008018532 A | 1/2008 |
| JP | 5155774 B2 | 3/2013 |
| JP | 2019014016 A | 1/2019 |

OTHER PUBLICATIONS

Hermes, Cerfine/Microlite CG, www.hermes-abrasives.com, last accessed Apr. 8, 2021, 2 pages.
Aerospace Manufacturing and Design, Dual-worm grinding wheels, published Jun. 18, 2020, https://www.aerospacemanufacturinganddesign.com/product/norton-abrasives-dual-worm-grinding-wheels, 4 pages.
International Search Report and Written Opinion for PCT/US2022/073330, mailed Oct. 27, 2022, 11 pages.

\* cited by examiner

ABRASIVE ARTICLES AND METHODS FOR FORMING SAME

CROSS-REFERENCE TO RELATED APPLICATION(S)

This application claims priority under 35 U.S.C. § 119(e) to U.S. Provisional Application No. 63/216,838, entitled "ABRASIVE ARTICLES AND METHODS FOR FORMING SAME," by Alexander NASHED et al., filed Jun. 30, 2022, which is assigned to the current assignee hereof and incorporated herein by reference in its entirety.

FIELD OF THE DISCLOSURE

The present invention relates, in general, to abrasive articles, in particular, to abrasive articles having a plurality of portions and methods of forming the same.

DESCRIPTION OF THE RELATED ART

Abrasive articles are used in material removal operations, such as cutting, grinding, or shaping various materials. Fixed abrasive articles include abrasive particles held in a bond material. The bond material can include an organic and/or inorganic material. The industry continues to demand improved abrasive articles.

BRIEF DESCRIPTION OF THE DRAWINGS

The present disclosure may be better understood, and its numerous features and advantages made apparent to those skilled in the art by referencing the accompanying drawings.

Figure 1:
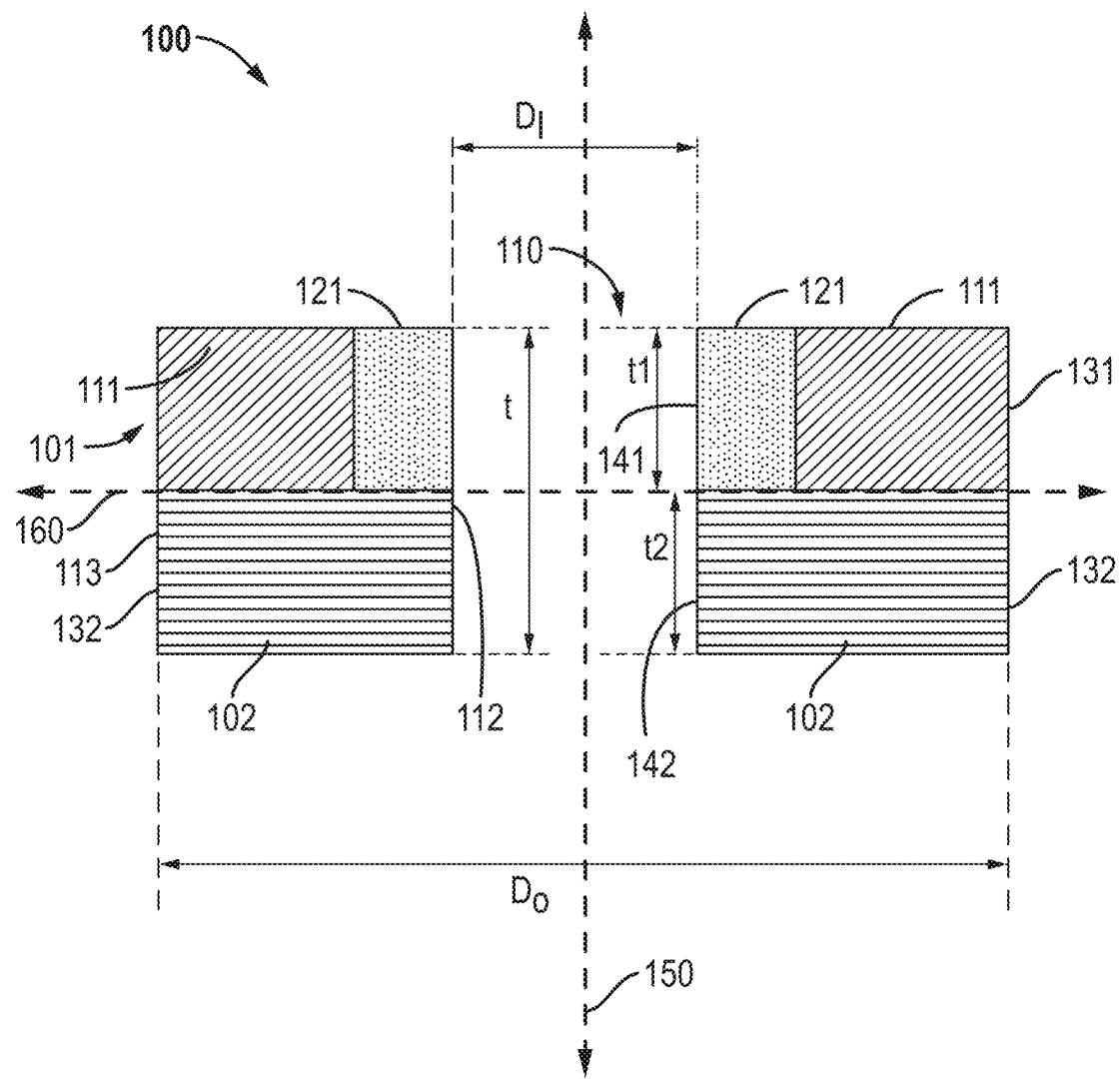
FIG. 1 includes an illustration of a cross-section of the abrasive body of an abrasive article according to another embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having," or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

Also, the use of "a" or "an" is employed to describe elements and components described herein. This is done merely for convenience and to give a general sense of the scope of the invention. This description should be read to include one or at least one, and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are directed to abrasive articles, including a body including a plurality of portions. In an aspect, the portions may include a different abrasive characteristic. For example, the body may include a first portion coupled to a second portion, in which the first portion may be configured to conduct a coarse grinding operation, and the second portion may be configured to conduct a fine grinding operation. In a further aspect, the portions may include a different composition. For example, the first portion may include abrasive particles contained in a bond material, including an inorganic material, and the second portion may include abrasive particles contained in a bond material, including an organic material. The abrasive articles of embodiments herein can have improved dimension and/or thermal stability in fast material-removal operations. In particular, the abrasive article can have improved fracture-at-elongation, Young's Modulus, hardness, stiffness, coefficient of thermal expansion, or any combination thereof.

Embodiments are drawn to methods of forming abrasive articles. The methods may allow the formation of the body, including portions including a homogenous distribution of abrasive particles in a bond material. In particular embodiments, methods may include dispersing fine abrasive particles in a viscous bond material to form a uniform mixture, which facilitates formation of the abrasive articles having improved performance.

The abrasive articles of embodiments herein can include fixed abrasives, such as bonded abrasives. The abrasive body may have any suitable size and shape as known in the art and can be incorporated into various types of abrasive articles to form an abrasive article suitable for conducting material removal operations, including but not limited to abrasive wheels, cones, hones, cups, flanged-wheels, tapered cups, segments, mounted-point tools, discs, thin wheels, grinding wheels, large diameter cut-off wheels, and the like. In a particular embodiment, the abrasive articles can include abrasive wheels. In a more particular example, the abrasive articles may be suitable for gear grinding, which often demands both fast removal rates and the generation of precise surface features.

Referring to FIG. 1, a cross-sectional view of the body 100 of an exemplary abrasive article is illustrated in accordance with an embodiment. The body 100 may take the form of a wheel, including a central opening 110 extending in the direction of the longitudinal axis 150. As illustrated, the longitudinal axis 150 extends in the axial direction and perpendicularly through the radial plane 160. The body 100 can include a first portion 101 and a second portion 102 that is coupled to the first portion 101 in the radial plane 160. In a particular embodiment, the first portion 101 can be bonded to the second portion 102. An adhesive may be used to facilitate the bonding of the first portion 101 to the second portion 102. An exemplary adhesive may include epoxy, polyurethane, or the like.

The body 100 can include the circumferential surface 112 defining the central opening 110 and the inner diameter $D_I$ of the body 100. The central opening can extend through the first portion 101 and through the second portion 102. The outer peripheral surface 113 of the body 100 may define the outer diameter $D_O$ of the body 100. The body may include a total thickness t. The central opening 110 may extend through the entire thickness of the body 100.

As illustrated in FIG. 1, the first portion 101 may include a thickness $t_1$ extending for a portion of the total thickness t, and the second portion 102 may include a thickness $t_2$ extending for another portion of the total thickness t. As illustrated, $t_1+t_2=t$. It will be appreciated that the body of embodiments herein may include one or more additional portions, such as a third portion, coupled to the first and second portions 101 and 102, and a total of the thickness of each of the portions may make up the total thickness t of the body.

The first portion 101 can include a peripheral region 111 and a central region 121 that are coaxial and coupled in the axial direction. In particular embodiments, the peripheral region 111 can be bonded to the central region 121 directly or indirectly. In an example, the peripheral region 111 may be sinter-bonded to the central region. In another example, an adhesive may be used to facilitate the bonding between the peripheral region 111 and the central region 121, and an exemplary adhesive may include epoxy, polyurethane, or the like.

The first portion 101 can include an inner circumferential surface 141 and outer peripheral surface 131. As illustrated, the inner circumferential surface 141 may define a portion of the circumferential surface 112 of the body 100, and the outer peripheral surface 131 may define a portion of the outer peripheral surface 113.

The second portion 102 can include an inner circumferential surface 142 and an outer peripheral surface 141. The inner circumferential surface 142 may define a portion of the circumferential surface 112 of the body 100, and the outer peripheral surface 141 may define a portion of the outer peripheral surface 113.

In an embodiment, the outer peripheral surface 113 of the body 100 can be profiled. For example, the outer peripheral surface 113 can include surface features to facilitate a material removal operation on a workpiece. In particular, the surface features can be complimentary to the surface features of the workpiece. In an embodiment, the surface features can include geometric features. In further embodiments, the surface features may include threads, a particular roughness, or the like to facilitate material removal operations on workpieces.

Figure 2:
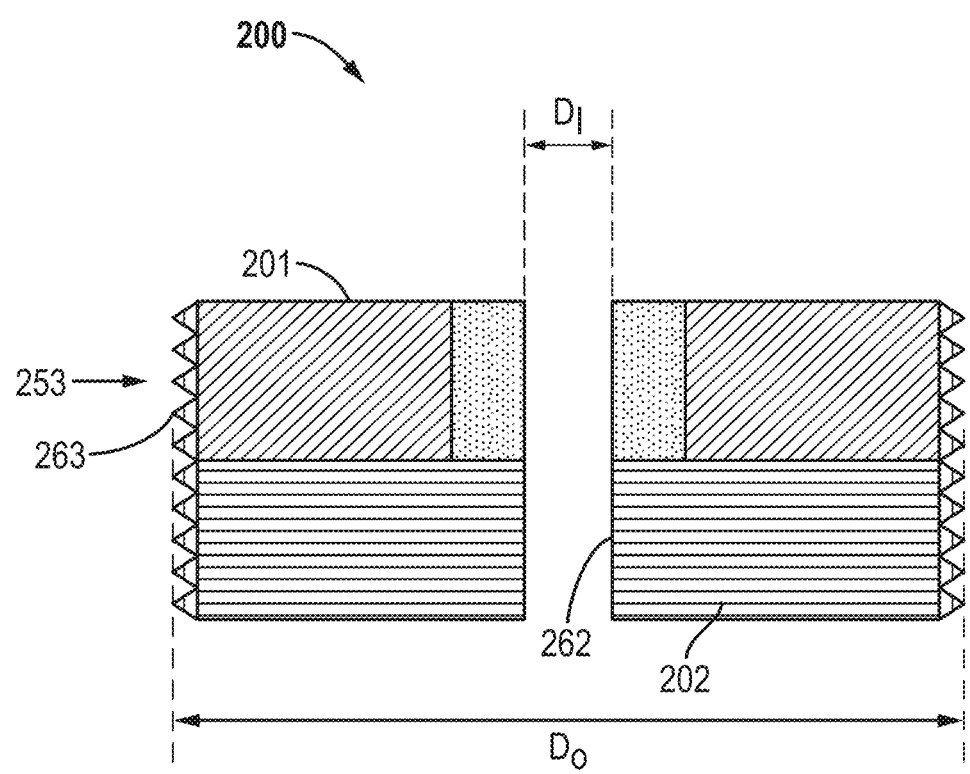
FIG. 2 includes an illustration of the body of an exemplary abrasive article according to an embodiment.

Briefly turning to FIG. 2, a cross-sectional view of the body 200 of another exemplary abrasive article is illustrated. The body 200 can include a first portion 201 and a second portion 202 and be similar to the body 100 illustrated in FIG. 1, except that the outer peripheral surface 253 can include surface features, such as geometric features, 263. In another embodiment, surface features, such as geometric features 263 or another feature, may be disposed on the circumferential surface of the body. For instance, the circumference surface 262 instead of the outer peripheral surface 253 may include the surface features 263.

Figure 3A:
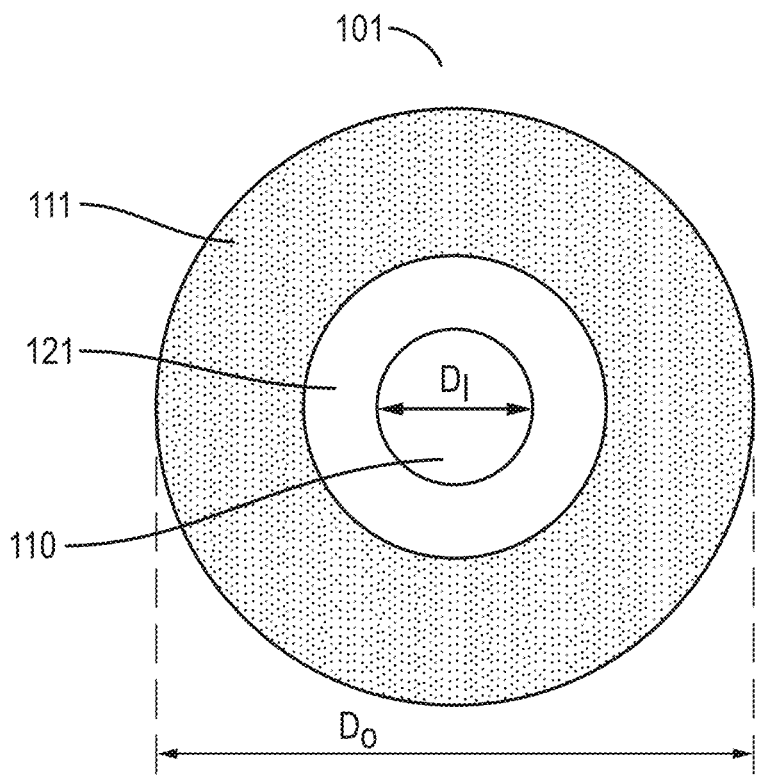
FIG. 3A includes an illustration of a top-down view of a portion of the body of FIG. 1.

FIG. 3A includes an illustration of the top-down view of the first portion 101 of the body 100 illustrated in FIG. 1, including the peripheral region 111 and the central region 121. In an embodiment, the first portion can include first abrasive particles contained in a first bond material.

In an embodiment, the first abrasive particles may include a material including an oxide, carbide, nitride, boride, oxycarbide, oxynitrides, silicate, oxyboride, superabrasives, minerals, or any combination thereof. For example, the first abrasive particles may include silicon dioxide, silicon carbide, alumina, zirconia, rare earth-containing materials, cerium oxide, sol-gel derived particles, iron oxide, gypsum, glass-containing particles, or a combination thereof. In a particular embodiment, the first abrasive particles may include an oxide, including an alumina-based material. For example, the first abrasive particles may include fused alumina, sol-gel alumina, sintered alumina, microcrystalline alumina, nanocrystalline alumina, sintered alumina with additives, shaped and sintered aluminum oxide, seeded alumina, pink alumina, ruby alumina, electrofused monocrystalline alumina, standard-ceramic alumina, alumina-zirconia, extruded bauxite, extruded alumina, or any combination thereof. In a particular example, the first abrasive particles may include seeded gel alumina particles.

In an embodiment, at least a portion of the first abrasive particles can include alpha-alumina having a particular average crystallite size. In an aspect, the first abrasive particles can include particles having alpha-alumina having an average crystallite size of at least 0.1 microns, at least 0.12 microns, at least 0.15 microns, or at least 0.17 microns. In another aspect, the average crystallite size may be at most 0.5 microns, such as at most 0.4 microns, at most 0.3 microns, or at most 0.2 microns. In another example, the first abrasive particles may include particles including alpha-alumina having an average crystallite size in a range including any of the minimum and maximum values noted herein.

In a further embodiment, the first abrasive particles may include particles including an alumina-based material, including at least 50 wt % of alumina for the total weight of the particles. For example, the particles may include at least 60 wt %, at least 70 wt %, at least 80 wt %, at least 90 wt %, at least 95 wt %, at least 96 wt %, at least 97 wt %, or at least 98 wt % of alumina for the total weight of the particles. In another example, the first abrasive particles may include particles including at most 99.9 wt % of alumina for the total weight of the particles, such as at most 99.5%, at most 99 wt %, or at most 98.5 wt % for the total weight of the particles. Moreover, the first abrasive particles can include particles including alumina in a content including any of the minimum and maximum percentages noted herein. In particular examples, the first abrasive particles can include alumina abrasive particles that consist essentially of alumina. In another particular example, the first abrasive particles can consist essentially of alumina. For example, the first abrasive particles may include at least 95 wt % of alumina for the total weight of the first abrasive particles, such as at least 96 wt % or at least 97 wt % or at least 98.5 wt % of alumina for the total weight of the first abrasive particles.

In an embodiment, the first abrasive particles may include one or more oxide of one or more elements from alkaline earth, rare earth, a transition metal, or any combination thereof. For example, the first abrasive particles may include a minor content of magnesia (MgO), zirconia ($ZrO_2$), titania ($TiO_2$), or any combination thereof. In a particular example, the total content of oxides other than alumina may be less than 50 wt % of the total weight of the first abrasive particles, such as at most 30 wt %, at most 20 wt %, at most 10 wt %, at most 5 wt %, at most 3 wt %, at most 1 wt %, or at most 0.5 wt %.

In another embodiment, the first abrasive particles may include a blend of abrasive particles. In an aspect, the first abrasive particles may include seeded alumina particles and fused alumina particles. In a particular aspect, the first abrasive particles may include alumina particles, including a particular content of chromium oxide. For instance, the alumina particles may include at least 0.3 wt % of chromium oxide for a total weight of the alumina abrasive particles, such as at least 0.5 wt %, at least 0.7 wt %, at least 1 wt %, at least 1.2 wt %, at least 1.3 wt %, or at least 1.4 wt % for a total weight of the first abrasive particles. In another example, the first abrasive particles may include alumina particles, including at most 5.0 wt % of chromium oxide for a total weight of the alumina abrasive particles, such as at most 4.5 wt %, at most 4.0 wt %, at most 3.5 wt %, at most 3.0 wt %, at most 2.5 wt %, at most 2.3 wt %, at most 2 wt %, at most 1.9 wt %, at most 1.8 wt %, at most 1.7 wt %, or at most 1.6 wt % for a total weight of the alumina abrasive particles. Moreover, the first abrasive particles may include alumina particles, including a content of chromium oxide in a range including any of the minimum and maximum percentages noted herein. In an even more particular aspect, the first abrasive particles may include seeded alumina particles and fused alumina particles including a content of chromium oxide noted herein.

In an embodiment, the first abrasive particles may include agglomerated abrasive particles, unagglomerated abrasive particles, shaped abrasive particles, non-shaped abrasive particles, or any combination thereof.

In an embodiment, the first portion may include elongated abrasive particles. In an aspect, the elongated particles may include seeded alumina. In another aspect, the elongated particles may include alpha alumina having the average crystallite size noted in embodiments herein.

Figure 4:
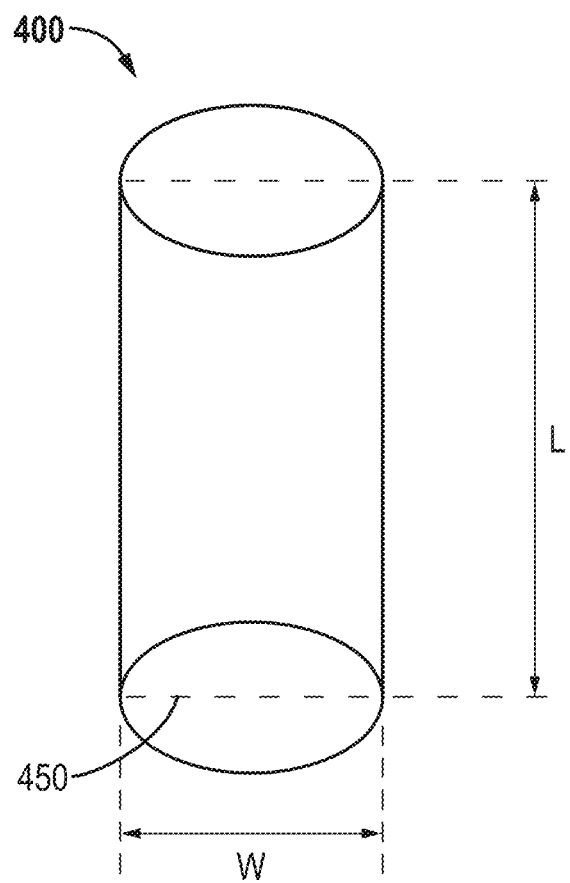
FIG. 4 includes an illustration of an abrasive particle according to another embodiment.

In another aspect, the first abrasive particles may include elongated abrasive particles having a particular average aspect ratio of length to cross-sectional width that can facilitate improved structure and/or performance of the abrasive article. It is to be appreciated that cross-sectional width can include diameter. Referring to FIG. 4, an exemplary elongated abrasive particle 400 is illustrated, including a cross-sectional width or diameter W and a length L. In an aspect, the first abrasive particles may include elongated particles having an average aspect ratio of length to cross-sectional width of at least 1.2, such as at least 1.5, at least 2, at least 2.3, at least 2.5, at least 2.8, at least 3, at least 4, at least 5, at least 6, at least 7, or at least 8. In another aspect, the average aspect ratio may be at most 30, at most 20, at most 15, at most 12, at most 10, at most 9, at most 8, at most 7, at most 6, at most 5, at most 4, or at most 3. Moreover, the first abrasive particles may include elongated abrasive particles having an aspect ratio of length to cross-sectional width in a range including any of the minimum and maximum values noted herein.

In an embodiment, the first abrasive particles can include elongated abrasive particles having a particular average cross-sectional width that can facilitate improved structure and/or performance of the abrasive article. In an aspect, the average cross-sectional width of at least 5 microns, such as at least 10 microns, at least 20 microns, at least 30 microns, at least 40 microns, at least 50 microns, at least 60 microns, at least 70 microns, at least 80 microns, at least 90 microns, at least 100 microns, at least 110 microns, at least 120 microns, at least 130 microns, at least 140 microns, at least 150 microns, at least 160 microns, at least 180 microns, or at least 200 microns. The average cross-sectional width of the elongated abrasive particles may be determined by using tiers of sieves to sieve the particles.

In another aspect, the first abrasive particles can include the elongated particles having an average cross-sectional width of at most 2000 microns, such as at most 1800 microns, at most 1500 microns, at most 1200 microns, at most 1100 microns, at most 1000 microns, at most 900 microns, at most 800 microns, at most 700 microns, at most 500 microns, at most 400 microns, at most 350 microns, at most 290 microns, at most 280 microns, at most 275 microns, at most 260 microns, at most 250 microns, at most 240 microns, at most 230 microns, at most 220 microns, at most 210 microns, at most 200 microns, at most 190 microns, at most 180 microns, at most 170 microns, at most 165 microns, at most 160 microns, at most 150 microns, at most 140 microns, at most 130 microns, at most 120 microns, at most 110 microns, at most 100 microns, at most 90 microns, at most 80 microns, at most 70 microns, at most 60 microns, or at most 50 microns. Moreover, the average cross-sectional width of the elongated abrasive particles can be in a range including any of the minimum and maximum values noted above. For instance, the average cross-sectional width of the elongated abrasive particles can be in a range including at least 20 microns and at most 2000 microns or in a range including at least 100 microns and at most 1200 microns.

In a particular aspect, the first abrasive particles may consist essentially of the elongated particles.

In another aspect, the first abrasive particles may include granule abrasive particles. In an example, the first abrasive particles may include granule abrasive particles having an average particle size of at most 500 microns, at most 450 microns, at most 400 microns, at most 380 microns, at most 350 microns, at most 320 microns, at most 300 microns, at most 280 microns, at most 260 microns, at most 255 microns, at most 250 microns, at most 240 microns, at most 230 microns, at most 210 microns, at most 200 microns, at most 180 microns, at most 160 microns, at most 150 microns, at most 130 microns, at most 120 microns, at most 110 microns, at most 100 microns, or at most 90 microns. In another aspect, the average particle size of the granule abrasive particles may be at least 40 microns, at least 50 microns, at least 60 microns, such as at least 80 microns, at least 90 microns, at least 100 microns, at least 110 microns, at least 120 microns, at least 140 microns, at least 150 microns, at least 170 microns, at least 180 microns, at least 190 microns, at least 200 microns, at least 210 microns, at least 230 microns, or at least 250 microns. Moreover, the average particle size of the granule abrasive particles can be in a range including any of the minimum and maximum values noted herein.

In an aspect, the first abrasive particles may consist essentially of granule abrasive particles. In a further aspect, the first abrasive particles may include the elongated abrasive particles and granule abrasive particles. In a particular aspect, the first abrasive particles may include the elongated abrasive particles, including seeded alumina and granule abrasive particles, including fused alumina or sintered alumina or any combination thereof. In another particular aspect, the first abrasive particles may include elongated particles and agglomerated granule particles. In a particular example, the first abrasive particles may consist essentially of elongated particles, agglomerated granule abrasive particles, or a combination thereof.

In an embodiment, at least a portion of the first abrasive particles may include shaped abrasive particles.

The shaped abrasive particles can have various shapes. In general, the shaped abrasive particles may have a shape similar to shaping components used in the forming process. For example, a shaped abrasive particle may have a predetermined two-dimensional shape as viewed in any two dimensions of the three-dimension shape, and particularly in a dimension defined by the length and width of the particle. Some exemplary two-dimensional shapes can include a polygon, an ellipsoid, a numeral, a Greek alphabet letter, a Latin alphabet letter, a Russian alphabet character, a Kanji character, a complex shape including a combination of polygonal shapes, and a combination thereof. In particular instances, the shaped abrasive particle may have a two-dimensional polygonal shape such as a triangle, a rectangle, a quadrilateral, a pentagon, a hexagon, a heptagon, an octagon, a nonagon, a decagon, and a combination thereof.

Figure 5A:
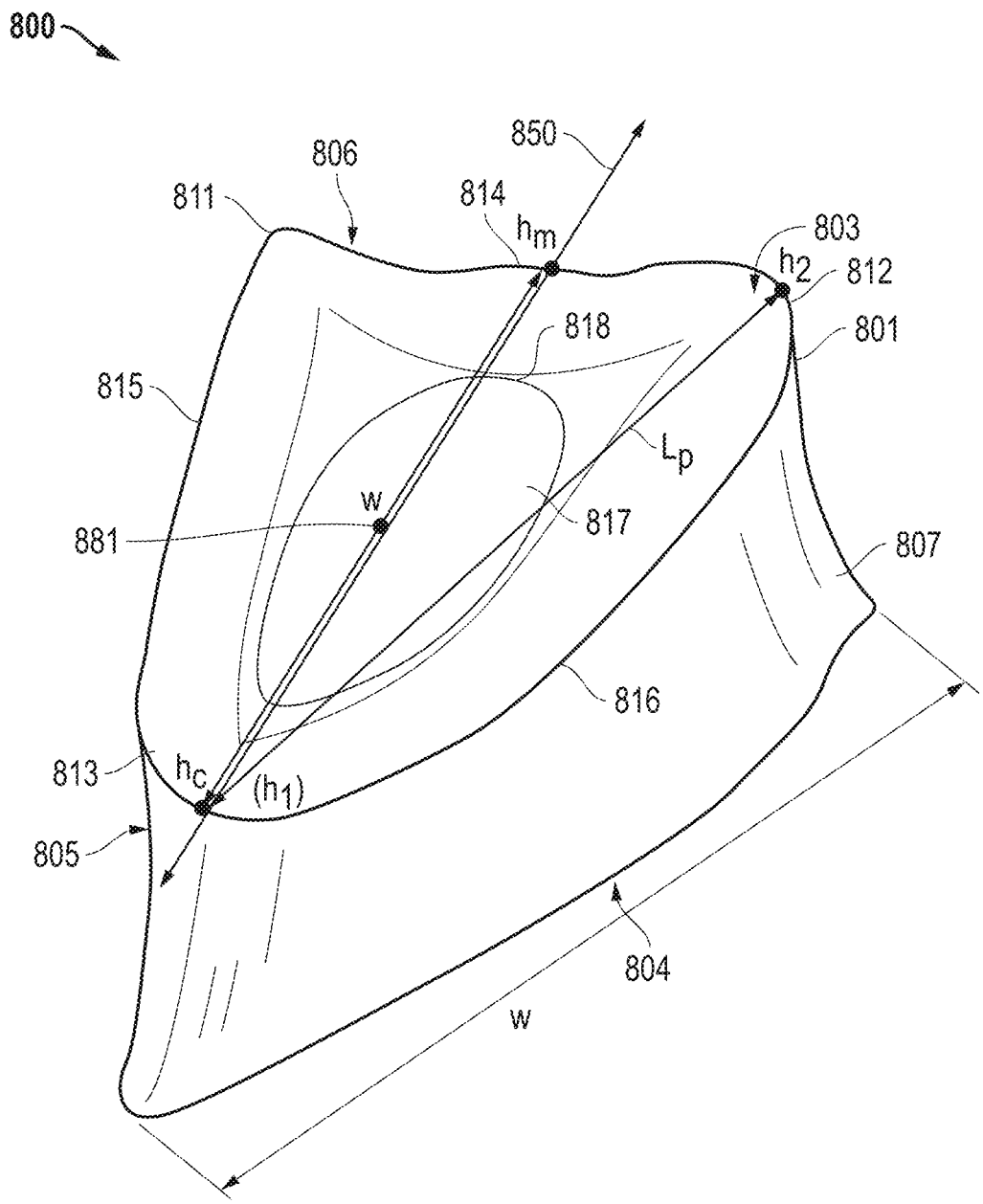
FIG. 5A includes a perspective view illustration of a shaped abrasive particle in accordance with an embodiment.
Figure 5B:
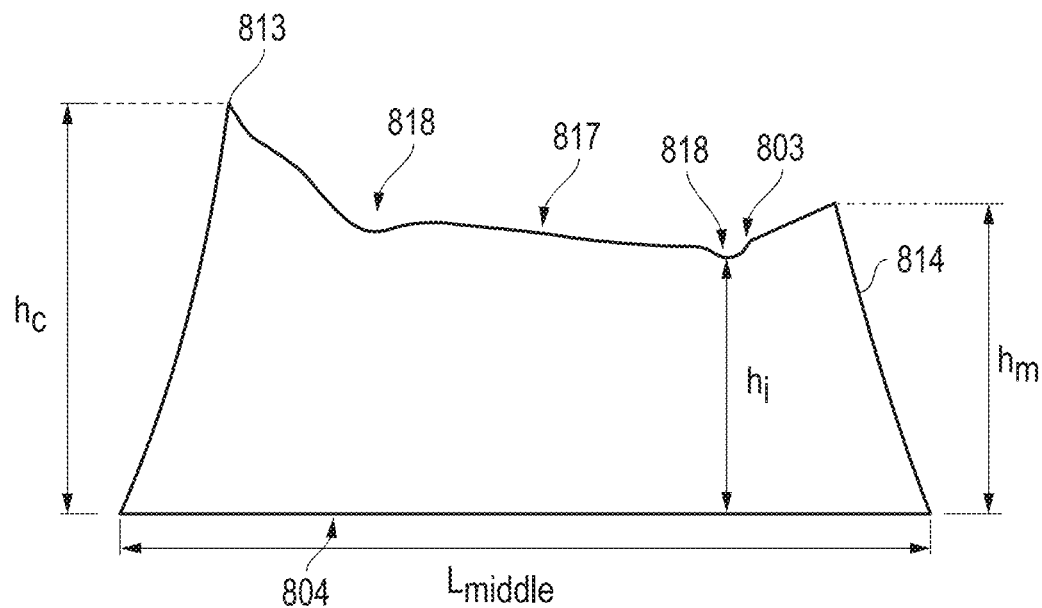
FIG. 5B includes a cross-sectional illustration of the shaped abrasive particle of FIG. 5A.

In one particular aspect, the shaped abrasive particles may be formed to have a shape as illustrated in FIG. 5A. FIG. 5A includes a perspective view illustration of a shaped abrasive particle in accordance with an embodiment. Additionally, FIG. 5B includes a cross-sectional illustration of the shaped abrasive particle of FIG. 5A. The body 801 includes an upper surface 803 and a bottom surface 804 opposite the upper surface 803. The upper surface 803 and the bottom surface 804 can be separated from each other by side surfaces 805, 806, and 807. As illustrated, the body 801 of the shaped abrasive particle 800 can have a generally triangular shape as viewed in a plane defined by the upper surface 803. In particular, the body 801 can have a length (Lmiddle) as shown in FIG. 5B, which may be measured at the bottom surface 804 of the body 801 and extending from a corner at the bottom surface corresponding to corner 813 at the top surface through a midpoint 881 of the body 801 to a midpoint at the opposite edge of the body corresponding to the edge 814 at the upper surface of the body. Alternatively, the body can be defined by a second length or profile length (Lp), which is the measure of the dimension of the body from a side view at the upper surface 803 or from a first corner 813 to an adjacent corner 812. Notably, the dimension of Lmiddle can be a length defining a distance between a height at a corner (hc) and a height at a midpoint edge (hm) opposite the corner. The dimension Lp can be a profile length along a side of the particle defining the distance between h1 and h2 (as explained herein). Reference herein to the length can be a reference to either Lmiddle or Lp.

The body 801 can further include a width (w) that is the longest dimension of the body and extending along a side. The shaped abrasive particle can further include a height (h), which may be a dimension of the shaped abrasive particle extending in a direction perpendicular to the length and width in a direction defined by a side surface of the body 801. Notably, as will be described in more detail herein, the body 801 can be defined by various heights depending upon the location of the body. In specific instances, the width can be greater than or equal to the length, the length can be greater than or equal to the height, and the width can be greater than or equal to the height.

Moreover, reference herein to any dimensional characteristic (e.g., h1, h2, hi, w, Lmiddle, Lp, and the like) can be a reference to a dimension of a single particle of a batch. Alternatively, any reference to any of the dimensional characteristics can refer to a median value or an average value derived from the analysis of a suitable sampling of particles from a batch. Unless stated explicitly, reference herein to a dimensional characteristic can be considered reference to a median value that is based on a statistically significant value derived from a sample size of a suitable number of particles of a batch. Notably, for certain embodiments herein, the sample size can include at least 40 randomly selected particles from a batch of particles. A batch of particles may be a group of particles that are collected from a single process run, and more particularly, may include an amount of shaped abrasive particles suitable for forming a commercial-grade abrasive product, such as at least about 20 lbs. of particles.

In accordance with an embodiment, the body 801 of the shaped abrasive particle can have a first corner height (hc) at a first region of the body defined by a corner 813. Notably, the corner 813 may represent the point of greatest height on the body 801, however, the height at the corner 813 does not necessarily represent the point of greatest height on the body 801. The corner 813 can be defined as a point or region on the body 301 defined by the joining of the upper surface 803, and two side surfaces 805 and 807. The body 801 may further include other corners, spaced apart from each other, including for example, corner 811 and corner 812. As further illustrated, the body 801 can include edges 814, 815, and 816 that can separated from each other by the corners 811, 812, and 813. The edge 814 can be defined by an intersection of the upper surface 803 with the side surface 806. The edge 815 can be defined by an intersection of the upper surface 803 and side surface 805 between corners 811 and 813. The edge 816 can be defined by an intersection of the upper surface 803 and side surface 807 between corners 812 and 813.

As further illustrated, the body 801 can include a second midpoint height (hm) at a second end of the body 801, which can be defined by a region at the midpoint of the edge 814, which can be opposite the first end defined by the corner 813. The axis 850 can extend between the two ends of the body 801. FIG. 5B is a cross-sectional illustration of the body 801 along the axis 850, which can extend through a midpoint 881 of the body 801 along the dimension of length (Lmiddle) between the corner 813 and the midpoint of the edge 814.

In accordance with an embodiment, the shaped abrasive particles of the embodiments herein, including for example, the particles of FIGS. 5A and 5B can have an average difference in height, which is a measure of the difference between hc and hm. For convention herein, the average difference in height will be generally identified as hc−hm, however, it is defined as an absolute value of the difference, and it will be appreciated that the average difference in height may be calculated as hm−hc when the height of the body 801 at the midpoint of the edge 814 is greater than the height at the corner 813. More particularly, the average difference in height can be calculated based upon a plurality of shaped abrasive particles from a suitable sample size, such as at least 40 particles from a batch as defined herein. The heights hc and hm of the particles can be measured using a STIL (Sciences et Techniques Industrielles de la Lumiere—France) Micro Measure 3D Surface Profilometer (white light (LED) chromatic aberration technique), and the average difference in height can be calculated based on the average values of hc and hm from the sample.

As illustrated in FIG. 5B, in one particular embodiment, the body 801 of the shaped abrasive particle may have an average difference in height at different locations at the body. The body can have an average difference in height, which can be the absolute value of [hc−hm] between the first corner height (hc) and the second midpoint height (hm) is at least about 20 microns. It will be appreciated that the average difference in height may be calculated as hm−hc when the height of the body 801 at a midpoint of the edge is greater than the height at an opposite corner. In other instances, the average difference in height [hc−hm] can be at least about 25 microns, at least about 30 microns, at least about 36 microns, at least about 40 microns, at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above.

Moreover, it will be appreciated that the average difference in height can be based upon an average value of hc. For example, the average height of the body at the corners (Ahc) can be calculated by measuring the height of the body at all corners and averaging the values, and may be distinct from a single value of height at one corner (hc). Accordingly, the average difference in height may be given by the absolute value of the equation [Ahc−hi], wherein hi is the interior height which can be the smallest dimension of the height of the body as measured along a dimension between any corner and opposite midpoint edge on the body. Furthermore, it will be appreciated that the average difference in height can be calculated using a median interior height (Mhi) calculated from a suitable sample size of a batch of shaped abrasive particles and an average height at the corners for all particles in the sample size. Accordingly, the average difference in height may be given by the absolute value of the equation [Ahc−Mhi].

In particular instances, the body 801 can be formed to have a primary aspect ratio, which is a ratio expressed as width:length, wherein the length may be Lmiddle, having a value of at least 1:1. In other instances, the body can be formed such that the primary aspect ratio (w:l) is at least about 1.5:1, such as at least about 2:1, at least about 4:1, or even at least about 5:1. Still, in other instances, the abrasive particle can be formed such that the body has a primary aspect ratio that is not greater than about 10:1, such as not greater than about 9:1, not greater than about 8:1, or even not greater than about 5:1. It will be appreciated that the body 801 can have a primary aspect ratio within a range between any of the ratios noted above. Furthermore, it will be appreciated that reference herein to a height is the maximum height measurable of the abrasive particle. It will be described later that the abrasive particle may have different heights at different positions within the body 801.

In addition to the primary aspect ratio, the abrasive particle can be formed such that the body 801 comprises a secondary aspect ratio, which can be defined as a ratio of length:height, wherein the length may be Lmiddle, and the height is an interior height (hi). In certain instances, the secondary aspect ratio can be within a range between about 5:1 and about 1:3, such as between about 4:1 and about 1:2, or even between about 3:1 and about 1:2. It will be appreciated that the same ratio may be measured using median values (e.g., median length and interior median height) for a batch of particles.

In accordance with another embodiment, the abrasive particle can be formed such that the body 801 comprises a tertiary aspect ratio, defined by the ratio width:height, wherein the height is an interior height (hi). The tertiary aspect ratio of the body 801 can be within a range between about 10:1 and about 1.5:1, such as between 8:1 and about 1.5:1, such as between about 6:1 and about 1.5:1, or even between about 4:1 and about 1.5:1. It will be appreciated that the same ratio may be measured using median values (e.g., median length, median middle length, and/or interior median height) for a batch of particles.

According to one embodiment, the body 801 of the shaped abrasive particle can have particular dimensions, which may facilitate improved performance. For example, in one instance, the body can have an interior height (hi), which can be the smallest dimension of the height of the body as measured along a dimension between any corner and opposite midpoint edge on the body. In particular instances, wherein the body is a generally triangular two-dimensional shape, the interior height (hi) may be the smallest dimension of height (i.e., measure between the bottom surface 804 and the upper surface 805) of the body for three measurements taken between each of the three corners and the opposite midpoint edges. The interior height (hi) of the body of a shaped abrasive particle is illustrated in FIG. 5B. According to one embodiment, the interior height (hi) can be at least about 28% of the width (w). The height (hi) of any particle may be measured by sectioning or mounting and grinding the shaped abrasive particle and viewing in a manner sufficient (e.g., light microscope or SEM) to determine the smallest height (hi) within the interior of the body 801. In one particular embodiment, the height (hi) can be at least about 29% of the width, such as at least about 30%, or even at least about 33% of the width of the body. For one non-limiting embodiment, the height (hi) of the body can be not greater than about 80% of the width, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body can be within a range between any of the above-noted minimum and maximum percentages.

A batch of shaped abrasive particles can be fabricated, wherein the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 28%, such as at least about 29%, at least about 30%, or even at least about 33% of the median width of the shaped abrasive particles of the batch. For one non-limiting embodiment, the median interior height (Mhi) of the body can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width. It will be appreciated that the median interior height (Mhi) of the body can be within a range between any of the above-noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above-noted minimum and maximum values.

For another embodiment, the body of the shaped abrasive particle can have an interior height (hi) of at least about 400 microns. More particularly, the height may be at least about 450 microns, such as at least about 475 microns, or even at least about 500 microns. In still one non-limiting embodiment, the height of the body can be not greater than about 3 mm, such as not greater than about 2 mm, not greater than about 1.5 mm, not greater than about 1 mm, or not greater than about 800 microns. It will be appreciated that the height of the body can be within a range between any of the above-noted minimum and maximum values. Moreover, it will be appreciated that the above range of values can be representative of a median interior height (Mhi) value for a batch of shaped abrasive particles.

For certain embodiments herein, the body of the shaped abrasive particle can have particular dimensions, including, for example, a width≥length, a length≥height, and a width≥height. More particularly, the body 801 of the shaped abrasive particle can have a width (w) of at least about 600 microns, such as at least about 700 microns, at least about 800 microns, or even at least about 900 microns. In one non-limiting instance, the body can have a width of not greater than about 4 mm, such as not greater than about 3 mm, not greater than about 2.5 mm, or even not greater than about 2 mm. It will be appreciated that the width of the body can be within a range between any of the above-noted minimum and maximum values. Moreover, it will be appreciated that the above range of values can be representative of a median width (Mw) for a batch of shaped abrasive particles.

The body 801 of the shaped abrasive particle can have particular dimensions, including, for example, a length (L middle or Lp) of at least about 0.4 mm, such as at least about 0.6 mm, at least about 0.8 mm, or even at least about 0.9 mm. Still, for at least one non-limiting embodiment, the body 801 can have a length of not greater than about 4 mm, such as not greater than about 3 mm, not greater than about 2.5 mm, or even not greater than about 2 mm. It will be appreciated that the length of the body 801 can be within a range between any of the above-noted minimum and maximum values. Moreover, it will be appreciated that the above range of values can be representative of a median length (Ml), which may be more particularly, a median middle length (MLmiddle) or median profile length (MLp) for a batch of shaped abrasive particles.

The shaped abrasive particle can have a body 801 having a particular amount of dishing, wherein the dishing value (d) can be defined as a ratio between an average height of the body 801 at the corners (Ahc) as compared to the smallest dimension of the height of the body at the interior (hi). The average height of the body 801 at the corners (Ahc) can be calculated by measuring the height of the body at all corners and averaging the values and may be distinct from a single value of height at one corner (hc). The average height of the body 801 at the corners or at the interior can be measured using a STIL (Sciences et Techniques Industrielles de la Lumiere—France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, or even not greater than about 1.5. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 801 of the particle of FIG. 5A, can have a bottom surface 804 defining a bottom area ($A_b$). In particular instances, the bottom surface 304 can be the largest surface of the body 801. The bottom surface can have a surface area defined as the bottom area ($A_b$) that is greater than the surface area of the upper surface 803. Additionally, the body 801 can have a cross-sectional midpoint area ($A_m$), defining an area of a plane perpendicular to the bottom area and extending through a midpoint 881 (a between the top and bottom surfaces) of the particle. In certain instances, the body 801 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore, the shaped abrasive particles of the embodiments herein, including, for example, the particle of FIG. 5B can have a normalized height difference of at least about 0.3. The normalized height difference can be defined by the absolute value of the equation $[(hc-hm)/(hi)]$. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, at least about 0.06.

It will be appreciated that the normalized height difference can be within a range between any of the minimum and maximum values noted above. Moreover, it will be appreciated that the normalized height values mentioned above can be representative of a median normalized height value for a batch of shaped abrasive particles.

In another instance, the body 801 can have a profile ratio of at least about 0.04, wherein the profile ratio is defined as a ratio of the average difference in height [hc−hm] to the length (Lmiddle) of the shaped abrasive particle, defined as the absolute value of [(hc−hm)/(Lmiddle)]. It will be appreciated that the length (Lmiddle) of the body can be the distance across the body 801 as illustrated in FIG. 5B. Moreover, the length may be an average or median length calculated from a suitable sampling of particles from a batch of shaped abrasive particles as defined herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above. Moreover, it will be appreciated that the above profile ratio can be representative of a median profile ratio for a batch of shaped abrasive particles.

According to another embodiment, the body 801 can have a particular rake angle, which may be defined as an angle between the bottom surface 804 and a side surface 805, 806, or 807 of the body. For example, the rake angle may be within a range between about 1° and about 80°. For other particles herein, the rake angle can be within a range between about 5° and 55°, such as between about 10° and about 50°, between about 15° and 50°, or even between about 20° and 50°. The formation of an abrasive particle having such a rake angle can improve the abrading capabilities of the abrasive particle. Notably, the rake angle can be within a range between any two rake angles noted above.

According to another embodiment, the shaped abrasive particles herein, including, for example, the particles of FIGS. 5A and 5B can have an ellipsoidal region 817 in the upper surface 803 of the body 801. The ellipsoidal region 817 can be defined by a trench region 818 that can extend around the upper surface 803 and define the ellipsoidal region 817. The ellipsoidal region 817 can encompass the midpoint 881. Moreover, it is thought that the ellipsoidal region 817 defined in the upper surface can be an artifact of the forming process and may be formed as a result of the stresses imposed on the mixture during the formation of the shaped abrasive particles according to the methods described herein.

The shaped abrasive particle can be formed such that the body includes a crystalline material, and more particularly, a polycrystalline material. Notably, the polycrystalline material can include abrasive grains. In one embodiment, the body can be essentially free of organic material, including, for example, a binder. More particularly, the body can consist essentially of a polycrystalline material.

In one aspect, the body of the shaped abrasive particle can be an agglomerate, including a plurality of abrasive particles, grit, and/or grains bonded to each other to form the body 801 of the abrasive particle 800. Suitable abrasive grains can include nitrides, oxides, carbides, borides, oxynitrides, oxyborides, diamond, superabrasives (e.g., cBN), and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 800 is formed such that the abrasive grains forming the body 800 include alumina, and more particularly, may consist essentially of alumina. In an alternative embodiment, the shaped abrasive particles can include geosets, including for example, polycrystalline compacts of abrasive or superabrasive materials including a binder phase, which may include a metal, metal alloy, super alloy, cermet, and a combination thereof. Some exemplary binder materials can include cobalt, tungsten, and a combination thereof.

The abrasive grains (i.e., crystallites) contained within the body may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the abrasive grains contained within the body can be at least about 0.01 microns, such as at least about 0.05 microns, such as at least about 0.08 microns, at least about 0.1 microns, or even at least about 1 micron. It will be appreciated that the abrasive grains can have an average grain size within a range between any of the minimum and maximum values noted above.

In accordance with certain embodiments, the abrasive particle can be a composite article, including at least two different types of abrasive grains within the body. It will be appreciated that different types of abrasive grains are abrasive grains having different compositions with regard to each other. For example, the body can be formed such that it includes at least two different types of abrasive grains, wherein the two different types of abrasive grains can be nitrides, oxides, carbides, borides, oxynitrides, oxyborides, diamond, and a combination thereof.

In accordance with an embodiment, the abrasive particle 800 can have an average particle size, as measured by the largest dimension measurable on the body 801, of at least 100 microns. In fact, the abrasive particle 800 can have an average particle size of at least 150 microns, such as at least 200 microns, at least 300 microns, at least 400 microns, at least 500 microns, at least 600 microns, at least 700 microns, at least 800 microns, or even at least 900 microns. Still, the abrasive particle 800 can have an average particle size that is not greater than 5 mm, such as not greater than 3 mm, not greater than 2 mm, or even not greater than 1.5 mm. It will be appreciated that the abrasive particle 100 can have an average particle size within a range between any of the minimum and maximum values noted above.

The shaped abrasive particles of the embodiments herein can have a percent flashing that may facilitate improved performance. Notably, the flashing defines an area of the particle as viewed along one side, such as illustrated in FIG. 6C, wherein the flashing extends from a side surface of the body within the boxes 888 and 889. The flashing can represent tapered regions proximate to the upper surface and bottom surface of the body. The flashing can be measured as the percentage of the area of the body along the side surface contained within a box extending between an innermost point of the side surface (e.g., 891) and an outermost point (e.g., 892) on the side surface of the body. In one particular instance, the body can have a particular content of flashing, which can be the percentage of the area of the body contained within the boxes 888 and 889 compared to the total area of the body contained within boxes 888, 889, and 890. According to one embodiment, the percent flashing (f) of the body can be at least about 10%. In another embodiment, the percent flashing can be greater, such as at least about 12%, such as at least about 14%, at least about 16%, at least about 18%, or even at least about 20%. Still, in a non-limiting embodiment, the percent flashing of the body can be controlled and may be not greater than about 45%, such as not greater than about 40%, or even not greater than about 36%. It will be appreciated that the percent flashing of the body can be within a range between any of the above minimum and maximum percentages. Moreover, it will be appreciated that the above flashing percentages can be representative of an average flashing percentage or a median flashing percentage for a batch of shaped abrasive particles.

Figure 5C:
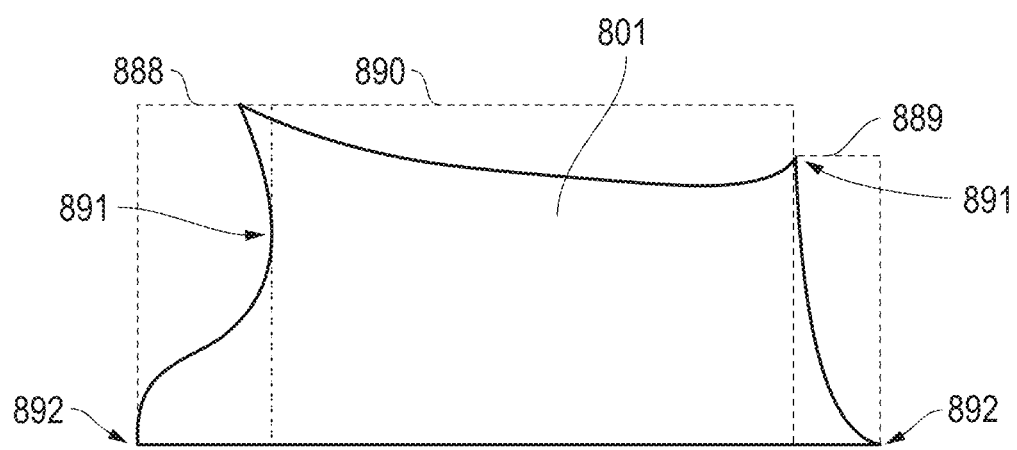
FIG. 5C includes a side-view illustration of a shaped abrasive particle according to an embodiment.

The percent flashing can be measured by mounting the shaped abrasive particle on its side and viewing the body at the side to generate a black and white image, such as illustrated in FIG. 5C. A suitable program for creating and analyzing images, including the calculation of the flashing, can be ImageJ software. The percentage flashing can be calculated by determining the area of the body 801 in the boxes 888 and 889 compared to the total area of the body as viewed at the side (total shaded area), including the area in the center 890 and within the boxes 888 and 889. Such a procedure can be completed for a suitable sampling of particles to generate average, median, and/or and standard deviation values.

A batch of shaped abrasive particles, according to embodiments herein, may exhibit improved dimensional uniformity as measured by the standard deviation of a dimensional characteristic from a suitable sample size. According to one embodiment, the shaped abrasive particles can have a flashing variation (Vf), which can be calculated as the standard deviation of flashing percentage (f) for a suitable sample size of particles from a batch. According to one embodiment, the flashing variation can be not greater than about 5.5%, such as not greater than about 5.3%, not greater than about 5%, or not greater than about 4.8%, not greater than about 4.6%, or even not greater than about 4.4%. In one non-limiting embodiment, the flashing variation (Vf) can be at least about 0.1%. It will be appreciated that the flashing variation can be within a range between any of the minimum and maximum percentages noted above.

The shaped abrasive particles of the embodiments herein can have a height (hi) and flashing multiplier value (hiF) of at least 4000, wherein hiF=(hi)(f), an "hi" represents a minimum interior height of the body as described above and "f" represents the percent flashing. In one particular instance, the height and flashing multiplier value (hiF) of the body can be greater, such as at least about 4500 micron %, at least about 5000 micron %, at least about 6000 micron %, at least about 7000 micron %, or even at least about 8000 micron %. Still, in one non-limiting embodiment, the height and flashing multiplier value can be not greater than about 45000 micron %, such as not greater than about 30000 micron %, not greater than about 25000 micron %, not greater than about 20000 micron %, or even not greater than about 18000 micron %. It will be appreciated that the height and flashing multiplier value of the body can be within a range between any of the above minimum and maximum values. Moreover, it will be appreciated that the above multiplier value can be representative of a median multiplier value (MhiF) for a batch of shaped abrasive particles.

The shaped abrasive particles of the embodiments herein can have a dishing (d) and flashing (F) multiplier value (dF) as calculated by the equation dF=(d)(F), wherein dF is not greater than about 90%, "d" represents the dishing value, and "f" represents the percentage flashing of the body. In one particular instance, the dishing (d) and flashing (F) multiplier value (dF) of the body can be not greater than about 70%, such as not greater than about 60%, not greater than about 55%, not greater than about 48%, not greater than about 46%. Still, in one non-limiting embodiment, the dishing (d) and flashing (F) multiplier value (dF) can be at least about 10%, such as at least about 15%, at least about 20%, at least about 22%, at least about 24%, or even at least about 26%. It will be appreciated that the dishing (d) and flashing (F) multiplier value (dF) of the body can be within a range between any of the above minimum and maximum values. Moreover, it will be appreciated that the above multiplier value can be representative of a median multiplier value (MdF) for a batch of shaped abrasive particles.

The shaped abrasive particles of the embodiments herein can have a height and dishing ratio (hi/d) as calculated by the equation hi/d=(hi)/(d), wherein hi/d is not greater than about 1000, "hi" represents a minimum interior height as described above, and "d" represents the dishing of the body. In one particular instance, the ratio (hi/d) of the body can be not greater than about 900 microns, not greater than about 800 microns, not greater than about 700 microns, or even not greater than about 650 microns. Still, in one non-limiting embodiment, the ratio (hi/d), can be at least about 10 microns, such as at least about 50 microns, at least about 100 microns, at least about 150 microns, at least about 200 microns, at least about 250 microns, or even at least about 275 microns. It will be appreciated that the ratio (hi/d) of the body can be within a range between any of the above minimum and maximum values. Moreover, it will be appreciated that the above height and dishing ratio can be representative of a median height and dishing ratio (Mhi/d) for a batch of shaped abrasive particles.

The first bond material can include an inorganic material. In a particular embodiment, the first bond material can consist essentially of an inorganic material. An exemplary inorganic material can include a ceramic, a vitreous material, or a combination thereof. Ceramic material is a composition that includes at least one metal or metalloid element, including but not limited to alkali metal elements, alkaline earth metal elements, lanthanoids, transition metal elements, and a combination thereof. A particular example of ceramic material may include oxides, carbides, nitrides, borides, and a combination thereof. In another embodiment, the first bond material may include a single crystalline phase, a polycrystalline phase, an amorphous phase, or a combination thereof.

In a further embodiment, the first bond material can include a vitreous material. The vitreous material can have an amorphous phase. In particular embodiments, the first bond material may consist essentially of vitreous material. In another embodiment, the first bond material can include a non-vitreous material. The non-vitreous material may include a polycrystalline phase. In still another embodiment, the first bond material can include a mixture of polycrystalline and vitreous material.

In an embodiment, the first bond material can include oxides including boron oxide ($B_2O_3$), silicon oxide ($SiO_2$), aluminum oxide ($Al_2O_3$), calcium oxide (CaO), magnesium oxide (MgO), barium oxide (BaO), strontium oxide (SrO), lithium oxide ($Li_2O$), sodium oxide ($Na_2O$), potassium oxide ($K_2O$), cesium oxide ($Cs_2O$), phosphorous oxide ($P_2O_5$), zircon, or any combination therefore.

In a further embodiment, the first bond material can include boron oxide ($B_2O_3$) in a particular content that may facilitate improved forming and/or performance of the abrasive article. Boron oxide can be present in a certain weight percentage compared to the total weight of the first bond material. For example, the first bond material may include at most 30 wt % of boron oxide ($B_2O_3$) for the total weight of the first bond material, such as at most 28 wt %, at most 26 wt %, at most 24 wt %, or at most 22 wt % for the total weight of the first bond material. For another instance, the first bond material may include at least 2 wt % of boron oxide for the total weight of the first bond material, such as at least 3 wt %, at least 4 wt %, at least 5 wt %, at least 6 wt %, at least 7 wt %, at least 8 wt %, at least 10 wt %, at least 12 wt %, or even at least 15 wt % for the total weight of the first bond material. It will be understood that the content of boron oxide in the first bond material can be in a range including any minimum to maximum percentages noted herein. For example, the first bond material can include a content of boron oxide in a range of 2 wt % to 30 wt %, in a range of 5 wt % to 30 wt %, or in a range of 8 wt % to 22 wt % for the total weight of the first bond material.

In an embodiment, the first bond material can include silicon oxide ($SiO_2$) in a certain content that may facilitate improved forming and/or performance of the abrasive article. The content of silicon oxide relative to the total weight of the bond material can be, for example, at most 80 wt %, at most 75 wt %, at most 70 wt %, at most 66 wt %, at most 65 wt %, at most 63 wt %, at most 60 wt %, at most 55 wt %, at most 52 wt %, or at most 50 wt %. In a particular instance, the first bond material can include silicon oxide of less than 66 wt % for the total weight of the first bond material. In another instance, the first bond material can include at least 25 wt % silicon oxide, such as at least 30 wt %, at least 35 wt %, at least 38 wt %, at least 40 wt %, at least 42 wt %, at least 45 wt %, at least 47 wt %, at least 48 wt %, or even at least 49 wt % for the total weight of the first bond material. It will be appreciated that the content of silicon oxide can be within a range including any minimum to maximum percentages noted above. For example, the silicon oxide content can be within a range of 35 wt % to 80 wt % or within a range of 40 wt % to 65 wt % for the total weight of the first bond material.

In a further embodiment, the first bond material can include a total content of boron oxide and silicon oxide that may facilitate improved forming and/or performance of the abrasive article. For instance, the total content of boron oxide and silicon oxide may be at most 80 wt % for the total weight of the first bond material, such as at most 77 wt %, at most 75 wt %, at most 73 wt %, at most 70 wt %, at most 70 wt %, or at most 65 wt % for the total weight of the first bond material. In another example, the total content of boron oxide and silicon oxide may be at least 40 wt %, at least 42 wt %, at least 46 wt %, at least 48 wt %, or even at least 50 wt % for the total weight of the first bond material. It will be appreciated that the total content of boron oxide and silicon oxide can be within a range, including any of the minimum and maximum percentages disclosed herein. For example, the total content of boron oxide and silicon oxide can be within a range from 40 wt % to 80 wt % or within a range from 42 wt % to 77 wt % or within a range from 46 wt % to 65 wt % for the total weight of the first bond material.

In an embodiment, the first bond material can include a particular ratio of weight percent silicon oxide ($SiO_2$): weight percent boron oxide ($B_2O_3$) that may facilitate improved forming and/or performance of the abrasive article. For example, the ratio can be at most 22:1, at most 21:1, at most 20:1, at most 19:1, at most 18:1, at most 16:1, at most 15:1, at most 12:1, at most 10:1, at most 9:1, at most 8:1, at most 7:1, at most 6.5:1, at most 6:1, at most 5.5:1, at most 5.2:1, at most 5:1, or at most 4.8:1. In another instance, the ratio of weight percent silicon oxide ($SiO_2$):weight percent boron oxide ($B_2O_3$) can be at least 1.3:1, at least 1.5:1, at least 1.7:1, at least 2:1, at least 2.2:1, at least 2.4:1, at least 2.6:1, at least 2.8:1, or at least 3:1. It will be appreciated that the ratio of weight percent silicon oxide ($SiO_2$):weight percent boron oxide ($B_2O_3$) can be within a range including any of the minimum and maximum values noted above. For example, the ratio can be within a range of 1:3 to 22:1 or within a range of 1:3 to 7:1.

In an embodiment, the first bond material can include aluminum oxide ($Al_2O_3$) in an amount that can facilitate improved forming and/or performance of the abrasive article. In an example, the first bond material can include at least 5 wt % aluminum oxide ($Al_2O_3$) for a total weight of the bond material, at least 8 wt %, at least 9 wt %, at least 10 wt %, at least 12 wt %, or at least 14 wt %. In another example, the first bond material can include at most 30 wt % aluminum oxide ($Al_2O_3$) for a total weight of the bond material, at most 28 wt %, at most 25 wt %, at most 23 wt %, at most 20 wt %, at most 19 wt % or at most 18 wt % for the total weight of the first bond material. It will be appreciated that the content of aluminum oxide can be in a range of any of the minimum and maximum percentages noted above. For instance, the first bond material may include a content of aluminum oxide within a range of 5 wt % to 31 wt % or within a range of 10 wt % to 25 wt % for the total weight of the first bond material.

In an embodiment, the first bond material may include a total content of aluminum and alumina that can facilitate improved forming and/or improved performance of the abrasive article. For example, the first bond material can include a total content of at least 15 wt % of alumina and aluminum metal ($Al_2O_3/Al$) for a total weight of the bond material, such as at least 18 wt %, such as at least 20 wt %, at least 22 wt %, or even at least 24 wt % of alumina and aluminum metal ($Al_2O_3/Al$) for the total weight of the first bond material. In another example, the first bond material can include at most 45 wt %, such as at most 42 wt %, at most 40 wt %, at most 38 wt %, at most 35 wt %, or even at most 32 wt % of the total content of alumina and aluminum metal for the total weight of the first bond material. It will be appreciated that the first bond material can include a total content of alumina and aluminum metal within a range, including any of the minimum and maximum percentages noted herein. For instance, the total content of alumina and aluminum metal can be within a range of 5 wt % to 45 wt % or within a range of 10 wt % to 40 wt % or within a range of 22 wt % to 35 wt % for the total weight of the first bond material.

In an embodiment, the first bond material can include a total content of aluminum oxide and silicon oxide that may facilitate improved formation and/or performance of the abrasive article. For instance, the total content of aluminum oxide and silicon oxide relative to the total weight of the bond material can be at least 50 wt %, such as at least 52 wt %, at least 56 wt %, at least 58 wt %, or even at least 60 wt %. In another example, the total content of aluminum oxide and silicon oxide can be at most 80 wt % for the total weight of the first bond material, or at most 79 wt %, at most 78 wt %, at most 77 wt %, at most 76 wt %, at most 75 wt %, at most 74 wt %, or at most 73 wt % for the total weight of the first bond material. It will be appreciated that the total content of aluminum oxide and silicon oxide can be within a range of any of the minimum to maximum percentages noted herein. For instance, the total content of aluminum oxide and silicon oxide can be within a range of 50 wt % to 79 wt %, within a range of 56 wt % to 75 wt %, or even within a range of 60 wt % to 73 wt % for the total weight of the first bond material.

In an embodiment, the first bond material may include a particular ratio of weight percent silicon oxide ($SiO_2$): weight percent aluminum oxide ($Al_2O_3$) that can facilitate improved forming and/or improved performance of the abrasive article. For instance, the ratio can be at most 5.5:1, at most 5:1, at most 4.5:1, at most 4:1, at most 3.5:1, at most 3:1, at most 2.5:1, at most 2.2:1, or at most 2:1. In another instance, the ratio of weight percent silicon oxide ($SiO_2$): weight percent aluminum oxide ($Al_2O_3$) can be at least 1.3:1, at least 1.5:1, at least 1.7:1, or at least 2:1. It will be appreciated that the ratio of weight percent silicon oxide to weight percent aluminum oxide can be within a range, including any of the minimum and maximum ratios noted above. For example, the ratio can be within a range of 1:1 to 2.5:1 or within a range of 1.3:1 to 2.2:1.

In an embodiment, the first bond material can include a particular content of zircon ($ZrSiO_4$) that may facilitate the formation of the abrasive article and improve performance. For example, the first bond material may include at least 1 wt % zircon for the total weight of the first bond material, such as at least 2 wt %, or at least 3 wt %, or at least 4 wt %, or at least 5 wt %, or at least 6 wt %, or at least 7 wt %, or at least 8 wt %, or at least 9 wt %, or at least 10 wt %, or at least 11 wt %, or at least 12 wt %, or at least 13 wt %, or at least 14 wt %, or at least 15 wt %, or at least 16 wt %, or at least 17 wt %, or at least 18 wt %, or at least 19 wt %, or at least 20 wt %, or at least 21 wt %, or at least 22 wt %, or at least 23 wt %, or at least 24 wt %, or at least 25 wt %, or at least 26 wt %, or at least 27 wt %, or at least 28 wt %, or at least 29 wt % for the total weight of the first bond material. In another instance, the first bond material may include at most 44 wt % zircon, at most 42 wt %, at most 40 wt %, at most 38 wt %, at most 36 wt %, at most 35 wt %, at most 34 wt %, at most 33 wt %, or at most 32 wt % for a total weight of the first bond material. It will be appreciated that the first bond material can include a content of zircon within a range, including any of the minimum and maximum percentages noted above. In at least one embodiment, the first bond material can be essentially free of zircon ($ZrSiO_4$).

In an embodiment, the first bond material can include at least one alkaline earth oxide compound (RO) in a content that may facilitate improved forming and/or performance of the abrasive article. The total content of alkaline earth oxide compounds relative to the total weight of the first bond material may be at most 6 wt %, at most 5 wt %, at most 4 wt %, at most 3.0 wt %, at most 2.5 wt %, or at most 2 wt %. In another embodiment, the total content of alkaline earth oxide compounds (RO) can be at least 0.5 wt % or at least 0.8 wt % for the total weight of the first bond material. It will be appreciated that the total content of alkaline earth oxide compounds (RO) can be within a range, including any of the minimum and maximum percentages noted herein. For instance, the total content of alkaline earth oxide compounds (RO) can be within a range of 0.5 wt % to 5.0 wt % for the total weight of the first bond material.

In an embodiment, the first bond material can include at most 3 different alkaline earth oxide compounds (RO) from calcium oxide (CaO), magnesium oxide (MgO), barium oxide (BaO), and strontium oxide (SrO). For instance, the first bond material may include at least 0.5 wt % calcium oxide (CaO) for the total weight of the bond material, at least 0.8 wt %, or at least 1 wt %. Alternatively, or additionally, the first bond material may include at most 3 wt % calcium oxide (CaO) for a total weight of the bond material, at most 2.8 wt %, at most 2.5 wt %, at most 2 wt %, or at most 1.7 wt %. Moreover, the content of calcium oxide may be in a range, including any of the minimum and maximum percentages noted herein. In at least one embodiment, the first bond material can be essentially free of calcium oxide (CaO).

In an embodiment, the first bond material can include an alkali oxide compound ($R_2O$). Exemplary alkali oxide compounds can include lithium oxide ($Li_2O$), sodium oxide ($Na_2O$), potassium oxide ($K_2O$), cesium oxide ($Cs_2O$), or the like. In a further embodiment, the first bond material can include at least one alkali oxide compound. Particularly, the first bond material may include an alkali oxide compound ($R_2O$) from lithium oxide ($Li_2O$), sodium oxide ($Na_2O$), potassium oxide ($K_2O$), cesium oxide ($Cs_2O$), and any combination thereof.

In an embodiment, the total content of the alkali oxide compounds relative to the total weight of the first bond material may be at most 25 wt %, or at most 22 wt % or at most 20 wt %. Alternatively, or additionally, the total content of the alkali oxide compounds can be at least 3 wt %, at least 5 wt %, at least 7 wt %, or at least 9 wt % for the total weight of the first bond material. It will be appreciated that the total content of alkali oxide compounds can be within a range of any of the minimum to maximum percentages noted herein. For example, the total content of alkali oxide compounds can be within a range of 3 wt % to 25 wt % or within a range of 7 wt % to 22 wt % for the total weight of the first bond material.

In an embodiment, the first bond material can include lithium oxide ($Li_2O$) in an amount that can facilitate improved forming and/or performance of the abrasive article. For example, the first bond material comprises at least 1 wt % lithium oxide ($Li_2O$) for the total weight of the first bond material, at least 1.5 wt % or at least 2 wt %. In another instance, the first bond material can include at most 7 wt % lithium oxide ($Li_2O$) for the total weight of the bond material, such as at most 6.5 wt %, at most 6 wt %, at most 5.5 wt %, or at most 5 wt %. It will be appreciated that the content of lithium oxide can be within a range of any of the minimum to maximum percentages noted above, including, for example, within a range of 1 wt % to 7 wt % or 1.5 wt % to 6 wt % for the total weight of the first bond material. In at least one embodiment, the bond material can be essentially free of lithium oxide ($Li_2O$).

In an embodiment, the first bond material can include sodium oxide ($Na_2O$) in an amount that can facilitate improved forming and/or performance of the abrasive article. The content of sodium oxide relative to the total weight of the first bond material can be, for example, at least 3 wt %, at least 4 wt %, or at least 5 wt %. In another example, the content of sodium oxide can be at most 15 wt % sodium oxide ($Na_2O$) for the total weight of the first bond material, at most 14 wt %, at most 13 wt %, at most 12 wt %, at most 11 wt %, or at most 10 wt %. It will be appreciated that the content of sodium oxide can be within a range of any of the minimum to maximum percentages noted above, including, for example, within a range of 3 wt % to 14 wt % or within a range of 4 wt % to 11 wt %.

In an embodiment, the first bond material can include potassium oxide ($K_2O$) in an amount that can facilitate improved forming and or performance of the abrasive article. For instance, the content of potassium oxide for the total weight of the first bond material can be at least 1 wt %, at least 1.5 wt % or at least 2 wt %. In another instance, the content of potassium oxide ($K_2O$) can be at most 15 wt % for the total weight of the first bond material, such as at most 13 wt %, at most 11 wt %, at most 10 wt %, at most 8 wt %, at most 7 wt %, at most 6.5 wt %, at most 6 wt %, or at most 5.5 wt %, or at most 5 wt %. It will be appreciated that the content of potassium oxide can be within a range of any of the minimum to maximum percentages noted herein, including, for example, within a range of 1 wt % to 15 wt %.

In an embodiment, the first bond material can include phosphorous oxide ($P_2O_5$) in a content that can facilitate improved forming and/or performance of the abrasive article. For example, the first bond material can include at most 3.0 wt % phosphorous oxide ($P_2O_5$) for the total weight of the first bond material, such as at most 2 wt % or at most 1 wt %. In at least one embodiment, the bond material can be essentially free of phosphorus oxide ($P_2O_5$).

In an embodiment, the first bond material can include a particular content of certain components that facilitates suitable formation and/or performance of the abrasive article. Such components can include manganese dioxide ($MnO_2$), iron oxide ($Fe_2O_3$), $ZrSiO_2$, $CoAl_2O_4$, titanium dioxide ($TiO_2$), or any combination thereof. For example, in one instance, the first bond material can include at most 2 wt % of any one of manganese dioxide ($MnO_2$), iron oxide ($Fe_2O_3$), $ZrSiO_2$, $CoAl_2O_4$, or titanium dioxide ($TiO_2$) for the total weight of the first bond material, such as at most 1 wt % or even at most 0.5 wt %. In at least one embodiment, the first bond material can be essentially free of any one of or combination of manganese dioxide ($MnO_2$), iron oxide ($Fe_2O_3$), $ZrSiO_2$, $CoAl_2O_4$, or titanium dioxide ($TiO_2$).

In a particular embodiment, the first bond material may have a composition including an amount of ceramic particles having a particular particle size distribution that can facilitate improved performance and property of the abrasive articles. In an aspect, the ceramic particles can have a particular average particle size D50c that can facilitate improved performance and properties of the abrasive article. The average particle size (D50), D10, and D90 of the ceramic particles can be determined by using laser diffraction particle size analysis of at least 1 g of discrete particles. In an example, the ceramic particles can include the average particle size (D50c) of at least 2 microns, at least 4 microns, at least 6 microns, at least 7 microns, at least 8 microns, at least 9 microns, at least 10 microns, at least 11 microns, at least 12 microns, at least 15 microns, at least 16 microns, at least 17 microns, at least 18 microns, at least 19 microns, at least 20 microns, at least 21 microns, at least 22 microns, at least 23 microns, at least 24 microns, or at least 25 microns. In another example, the ceramic particles can include the average particle size (D50c) of at most 35 microns, at most 34 microns, at most 33 microns, at most 32 microns, at most 31 microns, at most 30 microns, at most 29 microns, at most 28 microns, at most 27 microns, at most 26 microns, at most 25 microns, at most 24 microns, at most 23 microns, or at most 22 microns. Moreover, the average particle size of the ceramic particles D50c can be in a range, including any of the minimum and maximum values noted above. For instance, the ceramic particles can include the average particle size (D50c) in a range from 2 microns to 35 microns, in a range from 6 microns to 30 microns, or in a range from 6 microns to 25 microns.

In another aspect, the ceramic particles may have a particular D10 that may define the maximum particle size of the particles in the lowest 10% of the distribution (i.e., the particle size of the abrasive particles in the $10^{th}$ percentile of the distribution). For example, the ceramic particles can include a particle size distribution including a D10 of at least 1 micron, at least 2 microns, at least 3 microns, at least 5 microns, at least 5.5 microns, at least 6 microns, at least 6.5 microns, at least 7 microns, at least 7.5 microns, at least 8 microns, at least 8.3 microns, at least 8.5 microns, at least 8.8 microns, at least 9 microns, at least 9.2 microns, at least 9.4 microns, at least 9.6 microns, at least 9.8 microns, at least 10 microns, at least 10.5 microns, at least 10.8 microns, at least 11 microns, at least 11.3 microns, at least 11.5 microns, at least 11.8 microns, or at least 12 microns. In another example, the ceramic particles can include a D10 of at most 30 microns, at most 28 microns, at most 27 microns, at most 25 microns, at most 23 microns, at most 20 microns, at most 18 microns, at most 16 microns, at most 14 microns, or at most 13 microns. It will be appreciated that the ceramic particles can have a D10 within a range, including any of the minimum and maximum values noted above.

The ceramic particles may also have a particular D90 that may define the minimum particle size of the particles in the greatest 10% of the distribution (i.e., the particle size for the abrasive particles in the $90^{th}$ percentile of the distribution). In an example, the ceramic particles can include D90 of at least 12 microns, at least 15 microns, at least 18 microns, at least 20 microns, at least 22 microns, at least 23 microns, at least 24 microns, at least 27 microns, at least 29 microns, at least 30 microns, at least 31 microns, at least 33 microns, at least 35 microns, at least 37 microns, at least 38 microns, at least 40 microns, at least 41 microns, or at least 42 microns. In another example, the ceramic particles can include D90 of at most 58 microns, at most 56 microns, at most 54 microns, at most 52 microns, at most 50 microns, at most 48 microns, at most 46 microns, at most 45 microns, at most 44 microns, or at most 43 microns. It will be appreciated that the ceramic particles can have a D90 within a range, including any of the minimum and maximum values noted above.

In a further aspect, the ceramic particles can include a crystalline material, an amorphous material, or a combination thereof. In a particular aspect, the ceramic particles can include a polycrystalline material having a particular average crystallite size that can facilitate improved properties and performance of the abrasive articles. For instance, the average crystallite size can be at least 0.005 microns, at least 0.01 microns, at least 0.02 microns, at least 0.03 microns, at least 0.04 microns, at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16, at least 0.17 microns, at least 0.18 microns, at least 0.19 microns, at least 0.2 microns, at least 0.3 microns, at least 0.4 microns, at least 0.5 microns, at least 0.6, at least 0.7 microns, at least 0.8 microns, at least 0.9 microns, at least 1 microns, at least 1.3 microns, at least 1.5 microns, at least 1.8 microns, at least 2 microns, at least 3 microns, at least 4 microns, or at least 5 microns. In another instance, the ceramic particles can include a polycrystalline material having an average crystallite size of at most 75 microns, at most 60 microns, at most 50 microns, at most 40 microns, at most 30 microns, at most 20 microns, at most 10 microns, at most 9 microns, at most 8 microns, at most 7 microns, at most 6 microns, at most 5 microns, at most 4 microns, at most 3 microns, at most 2 microns, at most 1.5 microns, at most 1 microns, at most 0.9 microns, at most 0.8 microns, at most 0.7 microns, at most 0.6 microns, at most 0.5 microns, at most 0.4 microns, at most 0.3 microns, at most 0.2 microns, at most 0.1 microns, at most 0.09 microns, at most 0.08 microns, at most 0.07 microns, at most 0.06 microns, at most 0.05 microns, at most 0.04 microns, at most 0.03 microns, at most 0.02 microns, or at most 0.01 microns. Moreover, the ceramic particles can include a polycrystalline material having an average crystallite size in a range including any of the minimum and maximum values noted herein.

In a further aspect, the ceramic particles can include a material including an oxide, a carbide, a nitride, borides, oxycarbides, oxynitrides, silicates, or any combination thereof. In a particular example, the ceramic particles can include silicon dioxide, silicon carbide, alumina, zirconia, rare earth-containing materials, cerium oxide, sol-gel derived particles, iron oxide, glass-containing particles, and a combination thereof. In another aspect, the ceramic particles can include the same material as the abrasive particles. In another aspect, the ceramic particles can include a different material than the abrasive particles. In a particular example, the ceramic particles can include alumina, such as fused alumina, sol-gel alumina, microcrystalline alumina, nanocrystalline alumina, or any combination thereof. For instance, ceramic particles can include fused alumina. In another instance, the ceramic particles can include white alumina, pink alumina, or a combination thereof. In a particular implementation, the ceramic particles can consist essentially of fused alumina particles. In an even more particular implementation, the ceramic particles can consist essentially of white fused alumina. In another particular instance, the ceramic particles can include alpha-alumina, or more particularly, consist essentially of alpha-alumina.

In an aspect, the ceramic particles can include a particular Mohs's hardness that can facilitate improved performance and properties of the abrasive article. For instance, the ceramic particles can include a Mohs hardness of at least 5.5, at least 6, at least 6.5, at least 7, at least 7.5, at least 8, at least 8.5, or at least 9. In another instance, the ceramic particles can include a Mohs' hardness of at most 10, at most 9.5, at most 9, at most 8.5, at most 8, at most 7.5, or at most 7. Moreover, the ceramic particles can include a Mohs hardness in a range including any of the minimum and maximum values noted herein.

In a further aspect, the bond material can include at least 0.0005 wt % of the ceramic particles for the total weight of the bond material, such as at least 0.0008 wt %, at least 0.001 wt %, at least 0.002 wt %, at least 0.004 wt %, at least 0.006 wt %, at least 0.008 wt %, at least 0.01 wt %, at least 0.02 wt %, at least 0.05 wt %, at least 0.08 wt %, at least 0.1 wt %, at least 0.2 wt %, at least 0.4 wt %, at least 0.5 wt %, at least 0.7 wt %, at least 0.8 wt %, at least 0.9 wt %, at least 1 wt %, at least 1.2 wt %, at least 1.4 wt %, at least 1.6 wt %, at least 1.8 wt %, at least 2 wt %, at least 2.2 wt %, at least 2.5 wt %, at least 2.7 wt %, at least 3 wt %, at least 3.3 wt %, at least 3.5 wt %, at least 3.7 wt %, at least 3.9 wt %, at least 4 wt %, at least 4.1 wt %, at least 4.3 wt %, at least 4.5 wt %, at least 4.7 wt %, at least 4.9 wt %, at least 5 wt %, at least 6 wt %, at least 7 wt %, at least 9 wt %, at least 10 wt %, at least 12 wt %, at least 15 wt %, at least 17 wt %, at least 19 wt %, at least 20 wt %, at least 22 wt %, at least 25 wt %, at least 28 wt %, or at least 30 wt % for the total weight of the bond material. In another aspect, the content of the ceramic particles can be less than 50 wt % for the total weight of the bond material, such as at most 45 wt %, at most 43 wt %, at most 41 wt %, at most 39 wt %, at most 37 wt %, at most 35 wt %, at most 33 wt %, at most 31 wt %, at most 28 wt %, at most 26 wt %, at most 24 wt %, at most 22 wt %, at most 20 wt %, at most 18 wt %, at most 17 wt %, at most 15 wt %, at most 13 wt %, at most 11 wt %, at most 10 wt %, at most 9.7 wt %, at most 9.5 wt %, at most 9.4 wt %, at most 9.2 wt %, at most 9 wt %, at most 8.8 wt %, at most 8.6 wt %, at most 8.3 wt %, at most 8 wt %, at most 7.9 wt %, at most 7.7 wt %, at most 7.5 wt %, at most 7.3 wt %, at most 7 wt %, at most 6.9 wt %, at most 6.7 wt %, at most 6.6 wt %, at most 6.4 wt %, at most 6.2 wt %, at most 6 wt %, at most 5.8 wt %, at most 5.6 wt %, at most 5.4 wt %, at most 5.2 wt %, at most 5 wt %, at most 4.8 wt %, at most 4.6 wt %, at most 4.1 wt %, at most 3.9 wt %, at most 3.5 wt %, at most 3.3 wt %, at most 3 wt %, at most 2.7 wt %, at most 2.5 wt %, at most 2.2 wt %, at most 2 wt %, at most 1.5 wt %, or at most 1 wt % for the total weight of the bond material. Moreover, the content of the ceramic particles can be in a range, including any of the minimum and maximum percentages noted herein.

A skilled artisan will appreciate the content of the ceramic particles may be expressed in volume percent. In an aspect, the content of the ceramic particles can be at least 1 vol % for the total volume of the bond material, such as at least 1.3 vol %, at least 1.5 vol %, at least 1.8 vol %, at least 2 vol %, at least 2.2%, at least 2.5 vol %, at least 2.7 vol %, at least 3 vol %, at least 3.3 vol %, at least 3.5 vol %, at least 3.7 vol %, at least 3.9 vol %, at least 4 vol %, at least 4.1 vol %, at least 4.3 vol %, at least 4.5 vol %, at least 4.7 vol %, at least 4.9 vol %, at least 5 vol %, at least 6 vol %, or at least 7 vol % for the total volume of the bond material. In another aspect, the content of the ceramic particles can be at most 15 vol % for the total volume of the bond material, such as at most 12 vol %, at most 11 vol %, at most 10 vol %, at most 9.7 vol %, at most 9.5 vol %, at most 9.4 vol %, at most 9.2 vol %, at most 9 vol %, at most 8.8 vol %, at most 8.6 vol %, at most 8.3 vol %, at most 8 vol %, at most 7.9 vol %, at most 7.7 vol %, at most 7.5 vol %, at most 7.3 vol %, at most 7 vol %, at most 6.9 vol %, at most 6.7 vol %, at most 6.6 vol %, at most 6.4 vol %, at most 6.2 vol %, at most 6 vol %, at most 5.8 vol %, at most 5.6 vol %, at most 5.4 vol %, at most 5.2 vol %, at most 5 vol %, at most 4.8 vol %, at most 4.6 vol %, at most 4.3 vol %, or at most 4 vol % for the total volume of the bond material. Moreover, the content of the ceramic particles can be in a range, including any of the minimum and maximum percentages noted herein.

Referring to FIG. 3A, in an embodiment, the peripheral region 111 of the first portion 101 can include the abrasive particles and the bond material noted herein. In an aspect, the peripheral region 111 can include a particular content of the first bond material that can facilitate improved performance of the abrasive article. In an example, the peripheral region 111 can include at least 5 vol % of the first bond material for a total volume of the peripheral region 111, such as at least 7 vol %, at least 9 vol %, or at least 10 vol %, or at least 11 vol %, or at least 12 vol %, or at least 13 vol %, or at least 14 vol %, or at least 15 vol %, or at least 16 vol %, or at least 17 vol %, or at least 18 vol %, or at least 19 vol %, or at least 20 vol % of the first bond material for a total volume of the peripheral region. In another aspect, the peripheral region 111 can include at most 60 vol % of the first bond material for the total volume of the peripheral region 111, such as at most 55 vol %, or at most 50 vol %, or at most 46 vol %, or at most 40 vol %, or at most 35 vol %, or at most 30 vol %, or at most 28 vol %, or at most 20 vol %, or at most 15 vol % for the total volume of the peripheral region 111. Moreover, the peripheral region 111 may include a content of the first bond material in a range, including any of the minimum and maximum percentages noted herein.

In a further aspect, the first portion 101 of the body 100 may include a particular content of the bond material that may facilitate the improved formation of the body and/or improved performance of the abrasive article. In an example, the first portion 101 may include at least 5 vol % of the first bond material for the total volume of the first portion 101, at least 10 vol %, at least 15 vol %, at least 20 vol %, at least 25 vol %, at least 30 vol %, or at least 35 vol % for a total volume of the first portion 101. In another example, the first portion may include the first bond material of at most 60 vol % for the total volume of the first portion 101, such as at most 55 vol %, at most 50 vol %, at most 45 vol %, at most 40 vol %, at most 35 vol %, or at most 30 vol % for the total volume of the first portion 101. Moreover, the first portion may include the content of the first bond material in a range, including any of the minimum and maximum percentages noted herein.

In an aspect, the peripheral region may include a particular content of the first abrasive particles that can facilitate improved performance of the abrasive article. In an example, the peripheral region 111 may include the first abrasive particles of at least 5 vol % for the total volume of the peripheral region 111, such as at least 10 vol %, or at least 15 vol %, or at least 20 vol %, or at least 25 vol %, or at least 30 vol %, or at least 35 vol % for the total volume of the peripheral region 111. In another example, the first abrasive portion may include not greater than 70 vol % the first abrasive particles for the total volume of the peripheral region 111, such as not greater than 65 vol %, or not greater than 60 vol %, or not greater than 55 vol %, or not greater than 50 vol %, or not greater than 45 vol %, or not greater than 40 vol %, or not greater than 35 vol %, or not greater than 30 vol %. Moreover, the peripheral region 111 can include a content of the first abrasive particles in a range including any of the minimum to maximum percentages noted above. For example, the peripheral region may include a content of the abrasive particles in a range of 5 vol % to 70 vol % or in a range of 15 vol % to 45 vol % for the total volume of the peripheral region.

In a further aspect, the first portion 101 may include having a particular content of the first abrasive particles that may facilitate improved formation and performance of the abrasive article. For example, the first portion 101 may include at least 2 vol % of the first particles for a total volume of the first portion 101, such as at least 5 vol %, or at least 7 vol %, or at least 10 vol %, or at least 15 vol %, or at least 20 vol %, or at least 25 vol %, or at least 30 vol %, or at least 35 vol %, or at least 40 vol %, or at least 42 vol %, or at least 45 vol % for the total volume of the first portion 101. In another example, the first portion 101 may include at most 70 vol % of the first abrasive particles for the total volume of the first portion 101, such as at most 65 vol %, or at most 60 vol %, or at most 55 vol %, or at most 50 vol %, or at most 45 vol %, or at most 40 vol %, or at most 35 vol %, or at most 30 vol % for the total volume of the first portion 101. Moreover, the first portion 101 may include a content of the first abrasive particles within a range, including any of the minimum to maximum percentages noted herein. For example, the content of the first abrasive particles may be within a range of 5 vol % to 70 vol % or within a range of 15 vol % to 45 vol % for the total volume of the first portion 101.

In an embodiment, the peripheral region 111 can have porosity. The porosity can be in various forms. The porosity can extend throughout at least a portion of the entire volume of the first abrasive portion, and in certain instances, may extend substantially uniformly throughout the entire volume of the first abrasive portion. For instance, the porosity can be closed, open, or include closed porosity and open porosity. Closed porosity can be in the form of discrete pores that are isolated from each other by bond material and/or abrasive particles. Such closed porosity may be formed by pore formers. In other instances, the porosity may be open porosity defining an interconnected network of channels extending throughout at least a portion of the three-dimensional volume of the peripheral region 111. In an aspect, the peripheral region 111 can include a type of porosity selected from the group consisting of closed porosity, open porosity, and a combination thereof. In another aspect, the majority of the porosity can include open porosity. In a particular aspect, all of the porosity can essentially be open porosity. Still, in another aspect, the majority of the porosity can include closed porosity. For example, all of the porosity can be essentially closed porosity.

In an embodiment, the peripheral region 111 can have certain porosity to facilitate improved formation and properties of the abrasive article. In an aspect, the peripheral region 111 can have a porosity of at least 1 vol % for a total volume of the peripheral region, such as at least 5 vol % porosity, or at least 10 vol %, or at least 15 vol %, or at least 20 vol %, or at least 25 vol %, or at least 30 vol %, or at least 35 vol %, or at least 40 vol %, or at least 45 vol %, or at least 50 vol %, or at least 55 vol %. In another aspect, the peripheral region 111 may have at most 85 vol % porosity for the total volume of the peripheral region 111, such as at most 80 vol %, or at most 70 vol %, or at most 60 vol %, or at most 55 vol %, or at most 50 vol %, or at most 45 vol %, or at most 40 vol %, or at most 30 vol %. In a further embodiment, the peripheral region 111 can have porosity within a range including any of the minimum and maximum percentages noted herein. For example, porosity can be within a range of 0.5 vol % to 85 vol % for a total volume of the peripheral region 111, such as within a range of 30 vol % to 60 vol %.

In another embodiment, the first portion can have certain porosity to facilitate improved formation and properties of the abrasive article. For example, the first portion can have a porosity of at least 0.5 vol % for the total volume of the first portion, such as at least 1 vol %, at least 3 vol %, at least 5 vol % porosity or at least 10 vol %, or at least 15 vol %, or at least 20 vol %, or at least 25 vol %, or at least 30 vol %, or at least 35 vol %, or at least 40 vol %, or at least 45 vol %, or at least 50 vol %, or at least 55 vol %. In another example, the first portion may have at most 85 vol % porosity for the total volume of the first portion, such as at most 80 vol %, or at most 70 vol % or at most 60 vol %, or at most 55 vol %, or at most 50 vol %, or at most 45 vol %, or at most 40 vol %, or at most 30 vol %. In a further embodiment, the first portion can have a porosity within a range including any of the minimum and maximum percentages noted herein. For example, porosity can be within a range of 1 vol % to 85 vol % for a total volume of the first portion, such as within a range of 30 vol % to 60 vol %.

In an embodiment, the central region 121 may include an inorganic material. In an aspect, the central region 121 may include a vitrified material, a crystalline material, or a combination thereof. In a further aspect, the central region may include a vitrified material including an oxide-based composition, which may include some content of one or more of silica, boron oxide, alumina, zircon, sodium oxide, potassium oxide, iron oxide, titanium oxide, magnesium oxide, calcium oxide, and the like. In another aspect, the central region 121 may include a vitrified bond material that is similar or different than the first bond material. In a particular aspect, the central region 121 may consist essentially of a vitrified material, a polycrystalline material, an amorphous material, a monocrystalline material, or any combination thereof. In another aspect, the central region 121 may consist essentially of a vitrified bond material including at least one oxide of silica, boron oxide, alumina, zircon, one or more alkaline earth oxide, one or more alkali oxide, iron oxide, titanium oxide, nickel oxide, and chromium oxide.

In another particular embodiment, the central region 121 may include a particular content of a vitrified bond material that can facilitate improved formation and performance of the abrasive article. In an example, the central region 121 may include at least 5 wt % of the bond material for a total weight to of the central region 121, such as at least 8 wt %, at least 9 wt %, at least 10 wt %, at least 11 wt %, at least 12 wt %, at least 13 wt %, at least 14 wt %, or at least 15 wt % of the bond material for a total weight of the central region 121. In another example, the central region 121 may include at most 25 wt % of the bond material for a total weight of the central region, such as at most 22 wt %, at most 20 wt %, at most 18 wt %, at most 15 wt %, or at most 14 wt % of the bond material for a total weight of the central region 121. Moreover, the central region 121 may include a content of the bond material in a range including any of the minimum and maximum percentages noted herein.

In another embodiment, the central region 121 may include abrasive particles, one or more filler materials, or any combination thereof. In an aspect, the central region 121 may include a content of abrasive particles, including carbides, nitrides, borides, oxides, superabrasives, or any combination thereof. In another aspect, the central region 121 may include abrasive particles, including an alumina-based material. For example, abrasive particles may include sintered alumina, fused alumina, microcrystalline alumina, or any combination thereof. In still another aspect, the central region 121 may include abrasive particles having a particular average particle size that can facilitate improved formation and property and/or performance of the abrasive article. For instance, the central region may include abrasive particles having an average particle size of at least 40 microns, at least 50 microns, at least 60 microns, at least 70 microns, at least 75 microns, at least 80 microns, at least 85 microns, at least 90 microns, or at least 95 microns. In another example, the central region may include abrasive particles having an average particle size of at most 140 microns, such as of at most 120 microns, at most 110 microns, at most 100 microns, at most 90 microns, at most 85 microns, or at most 80 microns. Moreover, the central region 121 may include abrasive particles that have an average particle size in a range including any of the minimum and maximum values noted herein. In another aspect, the content of abrasive particles in the central region 121 may be in a range of 1 vol % to 30 vol % for the total volume of the central region 121. In a further aspect, the central region may include a blend of abrasive particles including different materials, average particle sizes, or a combination thereof.

In a particular aspect, the central region 121 may be essentially free of abrasive particles. Accordingly, the portion of the circumferential surface 112 defined by the circumferential surface 141 of the first portion 101 can be essentially free of abrasive particles.

The content of the abrasive particles may be expressed in weight percentage. In an example, the central region 121 may include at least 60 wt % of abrasive particles for the total weight of the central region, such as at least 65 wt %, at least 68 wt %, at least 70 wt %, at least 72 wt %, at least 75 wt %, at least 77 wt %, at least 80 wt %, at least 82 wt %, at least 84 wt %, at least 85 wt %, or at least 86 wt % of abrasive particles for the total weight of the central region 121. In another example, the central region 121 may include at most 92 wt % of abrasive particles, such as at most 92 wt %, at most 90 wt %, at most 88 wt %, at most 87 wt %, or at most 86 wt % of abrasive particles for the total weigh to the central region.

In another aspect, the central region 121 may include one or more filler materials including metals, ceramics, vitreous materials, polymers, needle-shaped materials, flakes, granular-shaped materials, fibrous materials, or any combination thereof. In a particular embodiment, the filler material can include at least one of chopped strand fibers, glass fibers, basalt fibers, mineral wool, a metal fiber, a ceramic fiber, a carbon fiber, an aramid fiber, wollastonite, frit, talc, mica, montmorillonite, clay, a pore former, hollow particles, grinding aids, defoamers, or any combination thereof. In another aspect, the central region may include a total content of one or more filler materials of at least 0.5 vol % and at most 30 vol % for the total volume of the central region 121. In another aspect, the central region 121 may be essentially free of filler material.

In an embodiment, the central region 121 may include a particular Vickers hardness that can facilitate improved properties and performance of the abrasive article. In an aspect, the central region 121 may include an average Vickers hardness of at least 5.5 GPa, at least 5.7 GPa, at least 5.8 GPa, or at least 5.9 GPa. In another aspect, the central region 121 can include an average Vickers hardness of at most 6.5 GPa, at most 6.4 GPa, or at most 6.3 GPa. It is to be appreciated that the central region 121 may include a Vickers hardness in a range including any of the minimum and maximum values noted herein. Vickers hardness is determined according to a standard test method for Vickers Indentation Hardness, ASTM C1327-2015.

In another embodiment, the central region 121 may include a Vickers hardness greater than Vickers hardness of the peripheral region 111. For example, the central region 121 may have a Vickers hardness at least 5% greater than Vickers hardness of the peripheral region 111, such as at least 10%, at least 20%, at least 30%, at least 40%, at least 50%, or at least 60% greater than Vickers hardness of the peripheral region 111. Alternatively or additionally, the central region 121 may include a Vickers hardness at most 300% greater than the Vickers hardness of the peripheral region 111. In at least one embodiment, the central region 121 may include Vickers hardness similar to Vickers hardness of the peripheral region 111. For example, the difference of Vickers hardness between the central region 121 and the peripheral region may be within 5% of the Vickers hardness of the peripheral region 111.

In an embodiment, the central region 121 may include porosity. In an aspect, the porosity may consist essentially of closed pores. In another aspect, the central region 121 may include porosity of at most 25 vol % of the total volume of the central region 121, such as at most 22 vol %, at most 18 vol %, at most 15 vol %, at most 12 vol %, at most 10 vol %, at most 8 vol %, at most 6 vol %, at most 4 vol %, at most 3 vol %, or at most 1 vol % for the total volume of the central region 121. In still another aspect, the central region 121 may include at least 0.5 vol % of porosity for the total volume of the central region 121, such as at least 1 vol %, at least 2 vol %, at least 3 vol %, or at least 5 vol % for the total volume of the central region. It will be appreciated that the central region 121 may include porosity in a range including any of the minimum and maximum percentages noted herein. In a particular aspect, the central region 121 may be essentially free of pores. In another particular aspect, the central region 121 may include a porosity in a content less than the content of porosity present in the peripheral region 111.

Figure 3B:
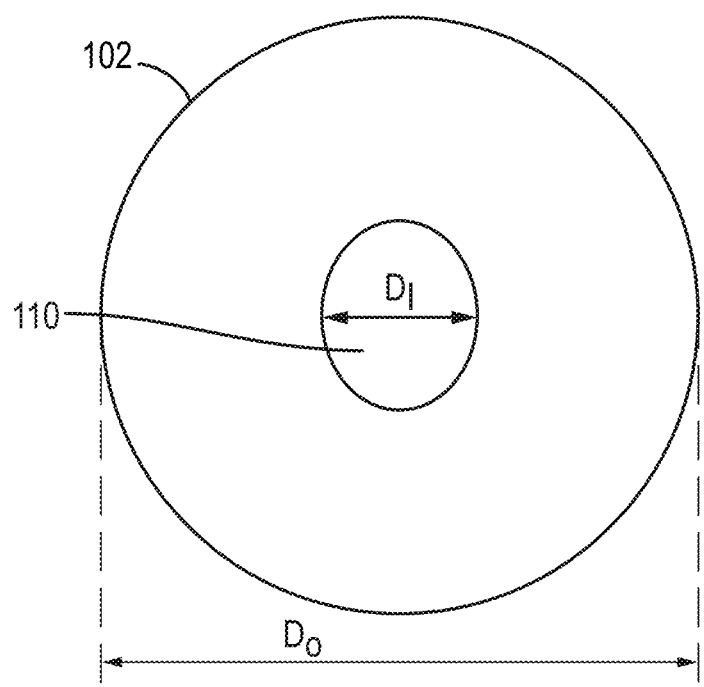
FIG. 3B includes an illustration of a top-down view of another portion of the body of FIG. 1.

Referring to FIG. 3B, a top-down view of the second portion 102 of the abrasive body 100 is illustrated. In an embodiment, the second portion 102 can include second abrasive particles contained in the second bond material, including an organic material. The organic material can include epoxy, epoxy-based material, epoxy-modified material, or the like. In a particular embodiment, the second bond material may consist essentially of organic material, including epoxy.

In an embodiment, the second portion 102 may include a particular content of the second bond material to facilitate the improved formation of the abrasive article. In an aspect, the second portion 102 may include at least 2 vol % of the second bond material for the total volume of the second portion 102, such as at least 5 vol %, at least 10 vol %, at least 12 vol %, at least 15 vol %, at least 20 vol %, at least 25 vol %, at least 28 vol %, at least 30 vol %, at least 35 vol %, at least 40 vol %, at least 45 vol %, at least 50 vol %, at least 55 vol %, at least 60 vol %, at least 65 vol %, at least 70 vol % for a total volume of the second portion 102. In another example, the second portion 102 may include the second bond material of at most 80 vol % for the total volume of the second portion 102, such as at most 70 vol %, at most 65 vol %, at most 60 vol %, at most 55 vol %, at most 52 vol %, at most 50 vol %, at most 48 vol %, at most 45 vol %, at most 41 vol %, at most 38 vol %, at most 35 vol %, or at most 30 vol % for a total volume of the second portion. Moreover, the second bond material may be in a content in a range including any of the minimum and maximum percentages noted herein.

The content of the second bond material may be expressed in weight percentage relative to the total weight of the second portion 102. In an aspect, the second portion 102 can include the second bond material of at least 25 wt % for a total weight of the second portion 102, such as at least 30 wt %, at least 32 wt %, at least 35 wt %, at least 38 wt %, at least 40 wt %, at least 42 wt %, at least 44 wt %, or at least 46 wt % for the total weight of the second portion 102. In another aspect, the content of the second bond material present in the second portion 102 can be at most 52 wt % for the total weight of the second portion 102, such as at most 50 wt %, at most 48 wt %, at most 46 wt %, at most 44 wt %, at most 42 wt %, or at most 40 wt % for the total weight of the second portion 102. It will be appreciated that the content of the second bond material can be in a range, including any of the minimum and maximum percentages noted herein.

In a further embodiment, the second portion can include the second bond material that may extend from the inner circumferential surface (e.g., the surface 142 illustrated in FIG. 1) to the outer peripheral surface (e.g., the surface 132 illustrated in FIG. 1), wherein one of the inner circumferential surface or the outer peripheral surface may be a work surface. In a further embodiment, the second portion may include a work surface including the second bond material and the second abrasive particles. In still another embodiment, at least a portion of a work surface of the body may be defined by the second bond material. For example, the second bond material may come into direct contact with a work piece in a material removal operation.

In an embodiment, the second abrasive particles can include a material including an oxide, and in particular, the second abrasive particles can include an oxide-based material. In an aspect, the second abrasive particles may include a polycrystalline oxide material, including alumina. For example, the second abrasive particles may include alumina-based abrasive particles, including a crystalline phase, including alpha alumina. In another example, the second abrasive particles may include alpha alumina, including an average crystallite size as described in embodiments in relation to the first abrasive particles. In another aspect, the second abrasive particles may include sintered alumina, fused alumina, seeded alumina, microcrystalline alumina, alumina sintered with additives, zirconia-alumina, nanocrystalline alumina, or any combination thereof. For example, the second abrasive particles may include fused alumina, sintered alumina, seeded gel alumina, or any combination thereof. In a particular example, the second abrasive particles may consist essentially of seeded gel alumina particles. In another particular example, the second abrasive particles may include a blend of abrasive particles, including fused alumina particles and seeded gel alumina particles. In another example, the second abrasive particles may include at least 90 wt % of alumina for the total weight of the second abrasive particles, at least 92 wt %, at least 94 wt %, at least 95 wt %, at least 97 wt %, or at least 98.5 wt % of alumina for the total weight of the second abrasive particles.

In an embodiment, the second abrasive particles can include a blend of abrasive particles, including unagglomerated particles, shaped abrasive particles, unshaped abrasive particles, elongated abrasive particles, agglomerated particles, or any combination thereof.

In an embodiment, the portion of the circumferential surface 112 defined by the inner circumferential surface 142 of the second portion 102 can include the second abrasive particles, the second bond material, or a combination thereof.

In an embodiment, the second portion 102 can include the second abrasive particles having a particular average particle size, $D_{50AP2}$, that can facilitate improved performance of the abrasive article. In an aspect, the second abrasive particles may include an average particle size $D_{50AP2}$ of at most 27 microns, at most 25 microns, at most 23 microns, at most 20 microns, at most 19 microns, at most 18 microns, at most 17 microns, at most 16 microns, at most 15 microns, at most 14 microns, at most 13 microns, at most 12 microns, at most 11.5 microns, at most 11 microns, at most 10.5 microns, at most 10 microns, at most 9.5 microns, at most 9 microns, at most 9.5 microns, at most 8 microns, at most 7.5 microns, at most 7 microns, at most 6.5 microns, at most 6 microns, at most 5.5 microns, or at most 5 microns. In another aspect, the second abrasive particles may include an average particle size $D_{50AP2}$ of at least 2 microns, at least 2.5 microns, at least 3 microns, at least 3.5 microns, at least 4 microns, at least 4.5 microns, at least 5 microns, at least 5.5. microns, at least 6 microns, at least 6.5 microns, at least 7 microns, at least 8 microns, at least 9 microns, at least 10 microns, or at least 11 microns. Moreover, the average particle size $D_{50AP2}$ may be in a range including any of the minimum and maximum values noted herein. For example, the second abrasive particles can include an average particle size in a range of at least 2 microns and at most 27 microns or in a range including at least 4 microns or at most 25 microns. In a particular example, the average particle size $D_{50AP2}$ of the second abrasive particles may be in a range of 2 microns to 14 microns, such as in a range of 2.5 microns to 11 microns. As used herein, average particle size is intended to refer to the medium value of particle size distribution, which is the value of the particle diameter at 50% in the cumulative distribution. The average particle size D50 of the abrasive particles can be determined by utilizing laser diffraction particle size analysis of at least 1 g of discrete particles.

In another aspect, the second abrasive particles may have a particular $D_{10AP2}$ that may define the maximum particle size of the particles in the lowest 10% of the distribution (i.e., the particle size of the abrasive particles in the 10th percentile of the distribution). For example, the second abrasive particles can include a particle size distribution including a $D_{10AP2}$ of at least 0.5 microns, at least 1 micron, at least 2 microns, at least 3 microns, at least 5 microns, at least 5.5 microns, at least 6 microns, at least 6.5 microns, at least 7 microns, at least 7.5 microns, at least 8 microns, at least 8.3 microns, at least 8.5 microns, at least 8.8 microns, at least 9 microns, at least 9.2 microns, at least 9.4 microns, at least 9.6 microns, at least 9.8 microns, at least 10 microns, at least 10.5 microns, at least 10.8 microns, at least 11 microns, at least 11.3 microns, at least 11.5 microns, at least 11.8 microns, or at least 12 microns. In another example, the second abrasive particles can include a $D_{10AP2}$ of at most 7 microns, at most 5 microns, at most 3 microns, or at most 2 microns. It will be appreciated that the second abrasive particles can have a $D_{10AP2}$ within a range, including any of the minimum and maximum values noted above.

The second particles may also have a particular $D_{90AP}$ that may define the minimum particle size of the particles in the greatest 10% of the distribution (i.e., the particle size for the abrasive particles in the $90^{th}$ percentile of the distribution). In an example, the second abrasive particles can include $D_{90AP}$ of at least 7 microns, at least 9 microns, at least 12 microns, at least 15 microns, or at least 18 microns. In another example, the second abrasive particles can include $D_{90AP2}$ of at most 58 microns, at most 56 microns, at most 54 microns, at most 52 microns, at most 50 microns, at most 48 microns, at most 46 microns, at most 45 microns, at most 44 microns, at most 43 microns, at most 40 microns, at most 38 microns, at most 34 microns, at most 31 microns, at most 28 microns, at most 25 microns, at most 22 microns, at most 20 microns, at most 18 microns, or at most 16 microns. It will be appreciated that the second abrasive particles can have a $D_{90AP}$ within a range, including any of the minimum and maximum values noted above.

In a further embodiment, the second abrasive particles may include a particular particle distribution measured according to FEPA 42-1:2006. In an aspect, the second abrasive particles may include a particular median grain size of $D_{s50}$-value that may facilitate improved formation and performance of the abrasive article. For example, the second abrasive particles may include $D_{s50}$-value of at most 15±1.5 microns, at most 14.5±1 microns, at most 14±1 microns, at most 13±1 microns, at most 12±1 microns, at most 11.5±1 microns, at most 11±1 microns, at most 10.5±1 microns, at most 10±1 microns, at most 9.5±1 microns, at most 9±1 microns, at most 9.5±1 microns, at most 8±1 microns, at most 7.5±1 microns, at most 7±1 microns, at most 6.5±1 microns, or at most 6±1 microns. In another example, the second abrasive particles may include $D_{s50}$-value of at least 2.5±0.5 microns, at least at least 3±0.5 microns, at least 3.5±0.5 microns, at least 4±0.5 microns, at least 4.5±1 microns, at least 5±1 microns, at least 5.5±1 microns, at least 6±1 microns, or at least 6.5±1 microns. Moreover, the second abrasive particles may include $D_{s50}$-value in a range including any of the minimum and maximum values noted herein.

In another aspect, the second abrasive particles may include a particular $D_{s94}$-value that may facilitate improved formation and performance of the abrasive article. For example, the second abrasive particles may include $D_{s94}$-value of at most 6.5 microns, at most 6 microns, at most 5.5 microns, at most 5 microns, at most 4.5 microns, at most 4 microns, at most 3.5 microns, at most 3 microns, at most 2.5 microns, or at most 2 microns. In another example, the second abrasive particles may include $D_{s94}$-value of at least 0.5 microns, at least 1 micron, at least 1.5 microns, at least 2 microns, at least 2.5 microns, or at least 3 microns. Moreover, the second abrasive particles may include $D_{s94}$-value in a range including any of the minimum and maximum values noted herein.

In an aspect, the second abrasive particles may include a particular $D_{s3}$-value that may facilitate improved formation and performance of the abrasive article. For example, the second abrasive particles may include $D_{s3}$-value of at most 22 microns, at most 20 microns, at most 19 microns, at most 18 microns, at most 17 microns, at most 16 microns, at most 15 microns, at most 14 microns, or at most 13 microns. In another example, the second abrasive particles may include $D_{s3}$-value of at least 5.5 microns, at least 6 microns, at least 6.5 microns, at least 7 microns, at least 8 microns, at least 9 microns, at least 10 microns, at least 11 microns, at least 12 microns, at least 13 microns, at least 14 microns, at least 15 microns, or at least 16 microns. Moreover, the second abrasive particles may include $D_{s3}$-value in a range including any of the minimum and maximum values noted herein.

In another embodiment, the second abrasive particles may include particles having particle sizes from 0.5 to 25 microns, wherein at most 3 wt % for the total weight of the second abrasive particles have the particle size coarser than 20 micron and at most 6 wt % for the total weight of the second abrasive particles have the particle size finer than 1 microns. In a particular example, the second abrasive particles may include median grain size of $D_{s50}$-value in a range including at least 2.5±0.5 microns and at most 12.5±1 microns, wherein at most 3 wt % of the second abrasive particles have the particle size coarser than 20 microns and at most 6 wt % of the second abrasive particles have the particle size finer than 1 microns.

In a further embodiment, the first and second abrasive particles can differ in materials, average particle sizes, crystallite sizes, shapes, properties (e.g., hardness and friability), or any combination thereof. In another embodiment, the first and second abrasive particles can include the same material but have different shapes, average particle sizes, properties, or any combination thereof. In a particular embodiment, both the first and second abrasive particles can include abrasive particles, including alumina.

In an embodiment, the second portion 102 can include a certain content of the second abrasive particles that may facilitate improved formation and properties of the abrasive article. In an aspect, the second portion can at least 5 vol % of the second abrasive particles for a total volume of the second portion, such as at least 10 vol %, or at least 15 vol %, or at least 20 vol %, or at least 25 vol %, or at least 30 vol %, or at least 35 vol %. In another aspect, the second portion may include at most 90 vol % of the second abrasive particles for the total volume of the second portion, such as at most 80 vol %, or at most 70 vol %, or at most 65 vol %, or at most 60 vol %, or at most 55 vol %, or at most 50 vol %, or at most 45 vol %, or at most 40 vol %, or at most 35 vol %, or at most 30 vol %. In a further aspect, the second portion can include a content of the second abrasive particles within a range, including any of the minimum and maximum percentages noted herein. For example, the content of the second abrasive particles can be within a range of 5 vol % to 90 vol % for the total volume of the second abrasive portion, such as within a range of 20 vol % to 90 vol %.

The content of the second abrasive particles can be expressed in weight percentage relative to the total weight of the second portion 102. In an aspect, the second portion 102 may include at least 25 wt % of the abrasive particles for the total weight of the second portion 102, such as at least 30 wt %, at least 32 wt %, at least 35 wt %, at least 38 wt %, at least 40 wt %, at least 42 wt %, at least 44 wt %, or at least 46 wt % for the total weight of the second portion 102. In another aspect, the content of the second abrasive particles present in the second portion 102 can be at most 75 wt % for the total weight of the second portion 102, such as at most 70 wt %, at most 65 wt %, at most 63 wt %, at most 60 wt %, at most 58 wt %, at most 57 wt %, or at most 55 wt % for the total weight of the second portion 102. It will be appreciated that the content of the second abrasive particles can be in a range, including any of the minimum and maximum percentages noted herein. In a particular embodiment, the second portion may include the second abrasive particles in a range from at least 35 wt % and at most 60 wt %, such as in a range including at least 43 wt % and at most 58 wt %, or in a range including at least 47 wt % and at most 57 wt %, or in a range including at least 52 wt % and at most 57 wt % for the total weight of the second portion.

In an embodiment, the body 100 can include a particular average particle size ratio between the first abrasive particles and the second abrasive particles that may facilitate improved performance of the abrasive article. In an aspect, the first abrasive particles can have an average particles size $D_{50AP1}$ greater than the average particle size of the second abrasive particles $D_{50AP2}$ $D_{50AP1}$ is intended to refer to the average particle size $D_{50}$ of the first abrasive particles. When elongated abrasive particles are present, cross-sectional widths of the elongated abrasive particles are used to determine the average particle size.

In an embodiment, the body 100 can have a certain ratio, $D_{50AP1}/D_{50AP2}$, of the average particle size of the first portion to the average particle size of the second portion to facilitate improved formation and properties of the abrasive article. In an aspect, the ratio $D_{50AP1}/D_{50AP2}$ can be greater than 1, such as at least 1.2, or at least 1.3, or at least 1.5, or at least 2, or at least 2.5, or at least 3, or at least 3.5, or at least 4, or at least 4.5, or at least 5, or at least 5.5, or at least 6, or at least 6.5, or at least 7, or at least 7.5, or at least 8, or at least 8.5, or at least 9, or at least 9.5, or at least 10, or at least 11, or at least 12, or at least 15. In another aspect, the ratio $D_{50AP1}/D_{50AP2}$ may be at most 80, such as at most 70, or at most 60, or at most 50, or at most 40, or at most 38, or at most 35, or at most 30, or at most 20, or at most 18, or at most 15, or at most 12. In a further embodiment, the ratio $D_{50AP1}/D_{50AP2}$ can be within a range including any of the minimum and maximum values noted herein. For instance, the abrasive article can have the ratio $D_{50AP1}/D_{50AP2}$ within the range including at least 1.2 and at most 80 or within a range including at least 2 and at most 70 or within a range including at least 3 and not greater than 60.

In one embodiment, the second abrasive particles may include an average particle size that is the same as or greater than the average particle size of the first portion. Accordingly, the body can include a ratio ($D_{50AP2}/D_{50AP1}$) noted in embodiments in relation to the ratio $D_{50AP1}/D_{50AP2}$.

In an embodiment, the second portion 102 may include a filler material. The filler material can be distinct from the second abrasive particles. An exemplary filler material may be one or more of metals, ceramics, vitreous materials, polymers, needle-shaped materials, flakes, granular-shaped materials, fibrous materials, or any combination thereof. In a further example, the filler material can include at least one of chopped strand fibers, basalt fibers, glass fibers, mineral wool, a metal fiber, ceramic fiber, a carbon fiber, an aramid fiber, wollastonite, frit, talc, carbon black, mica, montmorillonite, clay, a pore former, hollow particles, grinding aids, defoamers, graphite, or any combination thereof.

In a further embodiment, the second portion 102 may include a filler material in a content of not greater than 25 vol % of the total volume of the second portion 102, such as at most 20 vol %, at most 15 vol %, at most 12 vol %, at most 10 vol %, or at most 7 vol %. In some applications, graphite can be present in the second portion for up to 7 wt % for the total weight of the second portion, or up to 5 vol % of the total volume of the second portion 102. In another aspect, the second portion 102 can include at least 1 vol % filler for a total volume of the second portion 102 or at least 2 vol %, or at least 3 vol %, or at least 4 vol %, or at least 5 vol %, or at least 6 vol %, or at least 7 vol %, or at least 8 vol %, or at least 9 vol %, or at least 10 vol %, or at least 12 vol %, or at least 15 vol %, or at least 20 vol %, or at least 25 vol %, or at least 30 vol %, or at least 35 vol %. In a further aspect, the second portion 102 can include a filler material at a content within a range, including any of the minimum and maximum percentages noted herein. In one embodiment, the second portion may be essentially free of filler, such as having a filler content of not greater than 0.1 vol % for a total volume of the second portion 102.

In an embodiment, the second portion 102 can have porosity in various forms. For instance, the porosity can be closed, open, or include closed porosity and open porosity. In an aspect, the second portion 102 may include closed porosity, open porosity, or a combination thereof. In another aspect, the majority of the porosity can include open porosity. In a particular aspect, all of the porosity can essentially be open porosity. Still, in another aspect, the majority of the porosity can include closed porosity. For example, all of the porosity can be essentially closed porosity.

In an embodiment, the second portion 102 may have a certain content of porosity that may facilitate improved formation and properties of the abrasive article. In an aspect, the second portion 102 can have least 1 vol % porosity for a total volume of the second portion 102, such as at least 3 vol %, or at least 5 vol %, or at least 8 vol %, at least 10 vol %, or at least 12 vol %, or at least 15 vol %, or at least 18 vol %, or at least 20 vol %, or at least 25 vol %, or at least 30 vol %, or at least 35 vol %. In another aspect, the second portion 102 may have at most 65 vol % porosity for the total volume of the second portion 102, such as at most 50 vol %, or at most 45 vol %, or at most 40 vol %, or at most 35 vol %, or at most 30 vol %, or at most 25 vol %, or at most 20 vol %, or at most 15 vol %, or at most 10 vol %, or at most 8 vol %, or at most 5 vol %, or at most 2 vol %. In still another aspect, the second portion 102 can be essentially free of porosity, such as having at most 0.5 vol % porosity for the total volume of the second portion 102. In a further aspect, the second portion 102 can have a content of porosity within a range, including any of the minimum and maximum percentages noted herein. For example, the second portion 102 can have up to 65 vol % of porosity or up to 40 vol % of porosity for the total volume of the second portion 102. In another example, the second abrasive portion can have a content of porosity within a range of 1 vol % to 55 vol % for the total volume of the second portion 102.

In an embodiment, the second portion 102 can include an additive that can facilitate improved formation and performance of the abrasive article. In an aspect, the additive may include one or more thickening agents, gelling agents, or any combination thereof. A particular example of a suitable additive can include ultra-fine silica. In another example, the additive may include talc, ultra-fine alumina grits, organo-modified silicate, or any combination thereof.

In an embodiment, the second portion may include a particular content of the additive that can facilitate improved formation and performance of the abrasive article. In an aspect, the second portion 102 can include a content of silica of at least 0.05 wt % for the total weight of the second portion, at least 0.08 wt %, at least 0.1 wt %, at least 0.2 wt %, at least 0.3 wt %, at least 0.4 wt %, at least 0.5 wt %, at least 0.6 wt %, at least 0.7 wt %, or at least 0.8 wt %. In another aspect, silica may be in a content of at most 15 wt %, at most 12 wt %, at most 10 wt %, at most 9 wt %, at most 8 wt %, at most 7 wt %, at most 5 wt %, or at most 2 wt % for a total weight of the second portion 102. Moreover, the second portion 102 may include a content of silica in a range including any of the minimum or maximum percentages noted herein.

In a further embodiment, the second portion may include silica having an average particle size that can facilitate improved formation and performance of the abrasive particles. In an example, silica may have an average particle size $D_{50F}$ of at most 100 nm, such as at most 80 nm, at most 50 nm, at most 30 nm, at most 20 nm, at most 18 nm, at most 15 nm, or at most 12 nm. In another example, silica may have an average particle size $D_{50F}$ of at least 5 nm, at least 7 nm, at least 9 nm, at least 11 nm, or at least 12 nm. In a further example, silica may have an average particle size $D_{50F}$ in a range including any of the minimum and maximum values noted herein.

In an embodiment, the second portion 102 may include an average particle size ratio between second abrasive particles and silica. In an aspect, the ratio of $D_{50AP2}:D_{50F}$ may be at most 700, at most 600, or at most 500 or at most 450. In another aspect, the ratio of $D_{50AP2}:D_{50F}$ may be at least 50, at least 60, at least 70, at least 85, at least 100, at least 200, at least 300, or at least 400. Moreover, the ratio of $D_{50AP2}:D_{50F}$ may be in a range including any of the minimum and maximum values noted herein.

It is noteworthy that the second portion 102 can include an improved microstructure, including a homogenous distribution of the second abrasive particles throughout the second bond material, improved bond strength, and improved elasticity, rigidity, and balance therebetween, which facilitates improved performance of the abrasive article. In particular, the second portion of embodiments herein demonstrate improved performance characteristics over a conventional abrasive counterpart having different compositions, structures, or both. It is further notable the second portion 102 has improved properties and/or performance, including elongation-at-fracture, Young's modulus, and/or Modulus of Rupture, which allows the abrasive article of embodiments herein particularly suitable for operations including precision grinding and other material removal operations.

In an embodiment, the second portion 102 can include an improved elongation-at-fracture. In an aspect, the second portion 102 can include an elongation-at-fracture of less than 2.7%, such as at most 2.6%, at most 2.5%, at most 2.4%, or at most 2.3%. In another aspect, the second portion 102 can include an elongation-at-fracture of at least 1.6%, at least 1.7, at least 1.8%, at least 1.9%, at least 2.0%, at least 2.1%, at least 2.2%, or at least 2.3%. In a further aspect, the elongation-at fracture of the second abrasive portion 102 may be in a range including any of the minimum and maximum values noted herein. For example, the second portion 102 may include an elongation-at-fracture in a range of less than 2.7% and at least 1.6%.

Elongation-at-fracture can be determined using a 3-point bending test at room temperature (i.e., approximately 25° C.) as follows. Bar samples having a dimension of approximately 80 mm×20 mm×15 mm can be cut out of the second portion 102. Each bar can be placed on a testing machine known as 50 kN Pro-Line commercially available from Zwick/Roell or another functionally equivalent device with the two supporting pins spaced apart by 7 cm, and a loading force was applied to the middle of the bar by the loading pin. The traverse rate can be 10 mm/min, and a pre-force of 2 N can be applied. The average of elongation-at-fracture of at least 4 bar samples can be used as elongation-at-fracture of the second portion 102.

In a further embodiment, the second portion 102 can include improved Young's Modulus. In a further embodiment, the second portion 102 can include improved stiffness. In an aspect, the second portion 102 may include a particular Stiffness Value that can facilitate improved performance of the abrasive article. In this disclosure, Stiffness Value, $V_{YM}$, may be determined by the formula, $V_{YM}=V_{MOR}/(100 \times V_{EAF})$, wherein $V_{MOR}$ refers to Modulus of Rupture (MOR) of the second portion 102, and $V_{EAF}$ refers to the elongation-at-fracture of the second portion 102. MOR can be determined using the same 3-point bending test described in relation with elongation-at-fracture. Similarly, MOR of the second portion 102 is the average of MOR of at least 4 bar samples.

In an aspect, the second portion can have a Stiffness Value of at least 8.3, such as at least 8.5, at least 8.7, at least 8.8, at least 8.9, at least 9.0, at least 9.1, or at least 9.2. In another aspect, the second portion can have a Stiffness Value of at most 20, at most 19, at most 18, at least 16, at most 14, at most 12, at most 10, or at most 9.5. Moreover, the second portion 102 can have a Stiffness Value in a range including any of the minimum and maximum values noted herein.

In an embodiment, the second portion may include a particular Modulus of Rupture (MOR) that may facilitate improved performance of the abrasive article. In an example, the MOR of the second portion 102 may be at least 11 MPa, at least 13 MPa, at least 18 MPa, or at least 20 MPa. In another example, the second portion may include the MOR of at most 38 MPa, at most 35 MPa, at most 33 MPa, at most 30 MPa, at most 28 MPa, or at most 23 MPa. In a further example, the second portion may include an MOR in a range including any of the minimum and maximum values noted herein. For example, the MOR may be in a range of 11 to 38 MPa or in a range of 20 to 25 MPa.

In an embodiment, the second portion can include a particular storage modulus that can facilitate improved formation and performance of the abrasive article. Storage modulus can be determined by performing Dynamical Mechanical Analysis of a sample cut out of the second portion.

In an aspect, the second portion 102 can have a storage modulus at 25° C. of greater than 3130 MPa, such as at least 3200 MPa, at least 3500 MPa, at least 3800 MPa, at least 4000 MPa, at least 4200 MPa, or at least 4500 MPa. In another aspect, the second portion 102 may include a storage modulus at 25° C. of at most 6000 MPa, such as 5800 MPa, at most 5500 MPa, at most 5200 MPa, at most 5000 MPa, at most 4900 MPa, at most 4700 MPa, at most 4600 MPa, or at most 4500 MPa. In a further aspect, the second portion can include a storage modulus in a range including any of the minimum and maximum values noted herein. For example, the second portion 102 can include a storage modulus at 25° C. in a range of greater than 3130 MPa and at most 6000 MPa or in a range of at least 4000 MPa and at most 5500 MPa.

It is notable the second portion can maintain a relatively high storage modulus at elevated temperatures compared to a conventional counterpart. For example, the second portion can 102 have a storage modulus at 50° C. of greater than 2875 MPa, such as at least 3000 MPa, at least 3200 MPa, at least 3300 MPa, at least 3500 MPa, at least 3600 MPa, at least 3700 MPa, or at least 3800 MPa. In another example, the second portion 102 can include a storage modulus at 50° C. of at most 6000 MPa, at most 5800 MPa, at most 5500 MPa, at most 5200 MPa, at most 5000 MPa, at most 4800 MPa, at most 4400 MPa, at most 4200 MPa, at most 4000 MPa, or at most 3800 MPa. In another example, the second portion 102 can include a storage modulus at 50° C. in a range including any of the minimum and maximum values noted herein. For example, the second portion 102 can include a storage modulus at 50° C. in a range of greater than 2875 MPa and at most 6000 MPa or in a range of at least 3200 MPa and at most 5000 MPa or in a range of at least 3500 MPa and at most 4500 MPa.

In a further aspect, the second portion can include a particular decreasing rate of storage modulus over a temperature change that can facilitate improved formation and performance of the abrasive article. The decreasing rate, $R_{DSM}$ can be determined using the formula, $R_{DSM} = (S_{MRT} - S_{MET})/(T_{RT} - T_{ET})$, wherein $S_{MRT}$ represents storage modulus at 25° C. of the second portion 102, $S_{MET}$ represents storage modulus at an elevated temperature, such as 50° C., of the second portion 102, $T_{RT} = 25$, and $T_{ET}$ is the elevated temperature in the degree Celsius. In an example, the second portion 102 can include a decreasing rate of storage modulus from 25 to 50° C. of greater than 10.2 MPa/° C., such as at least 12, at least 15, at least 18, at least 20, at least 22, at least 24, at least 26, or at least 28. In another aspect, the second portion 102 may include a decreasing rate of storage modulus from 25 to 50° C. of at most 35, at most 34, at most 32, at most 30, at most 29, or at most 28. Moreover, the decreasing rate of storage modulus from 25 to 50° C. can be in a range including any of the minimum and maximum values noted herein.

In an embodiment, the second portion may include a particular coefficient of thermal expansion that may facilitate improved performance of the abrasive article. In an aspect, the second portion may have a particular coefficient of thermal expansion in the temperature range of 30° C. to 50° C. For example, the second portion may have a coefficient of thermal expansion at 30° C. to 50° C. of greater than 33 ppm/° C. or grater than 37 ppm/° C., such as at least 37.5 ppm/° C., at least 38 ppm/° C., at least 40 ppm/° C., at least 43 ppm/° C., at least 45 ppm/° C., at least 47 ppm/° C., at least 49 ppm/° C., at least 50 ppm/° C., at least 52.5 ppm/° C., at least 54 ppm/° C., at least 57 ppm/° C., or at least 60 ppm/° C. In another example, the second portion may include a coefficient of thermal expansion of less than 70 ppm/° C. or less than 69 ppm/° C. In a further example, coefficient of thermal expansion of the second portion may be at most 68 ppm/° C., such as at most 66 ppm/° C., at most 64 ppm/° C., at most 61 ppm/° C., at most 59 ppm/° C., at most 57 ppm/° C., at most 56 ppm/° C., at most 55 ppm/° C., or at most 53 ppm/° C. In still a further example, the second portion may include a coefficient of thermal expansion in a range including any of the minimum and maximum values noted herein. The coefficient of thermal expansion of the second portion can be determined as follows. TA Instruments Q400 Thermal Mechanical Analyzer with an Expansion fixture or a device of equivalent function may be used following ASTM E831.

Figure 6A:
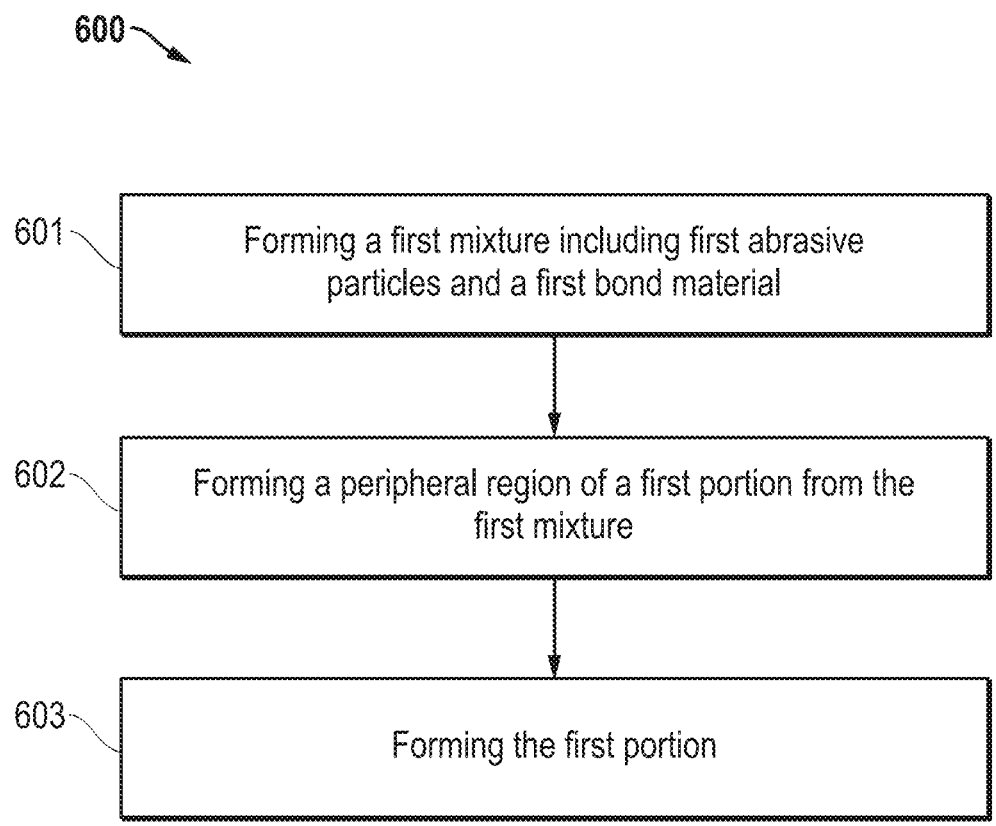
FIGS. 6A and 6B include flowcharts illustrating a forming process according to an embodiment.
Figure 6B:
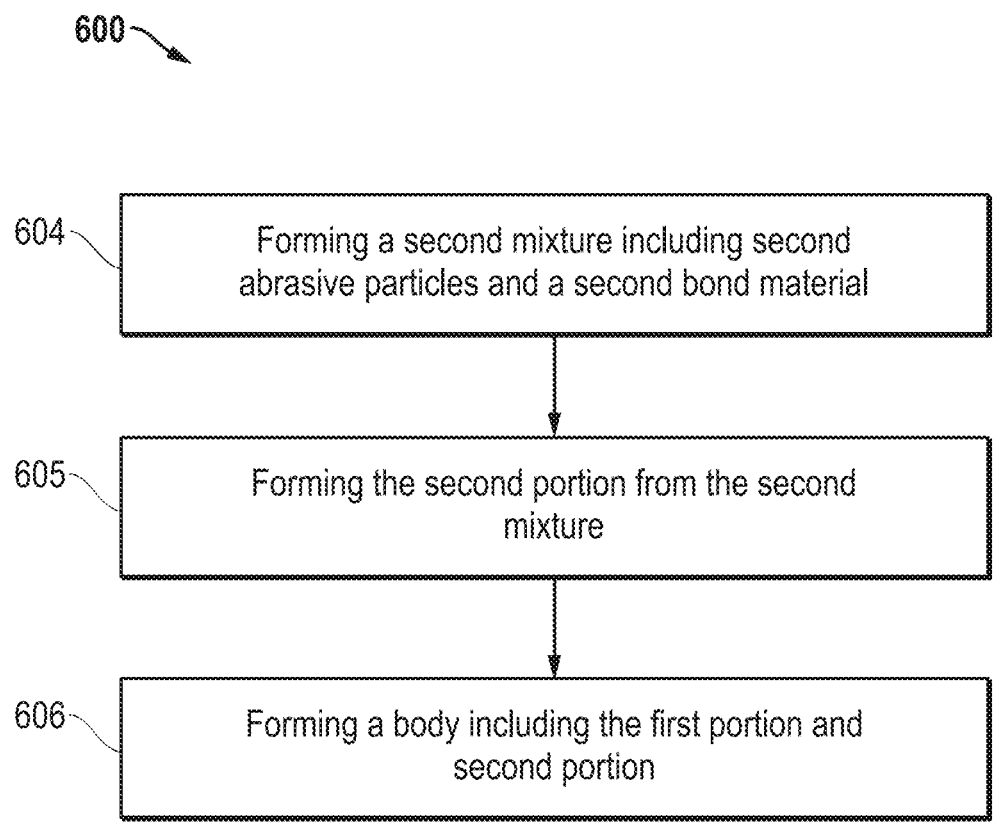

FIGS. 6A and 6B include an illustration of a process 600 for forming the abrasive article of embodiments herein. As illustrated, the first and second portions may be formed separately, and the process 600 can start at either block 601 or 604, as desired, forming a first or second mixture including abrasive particles and a bond or a precursor bond material. The precursor bond material can form a bond material of a finally formed portion. An exemplary precursor bond material can include a frit, a vitrified material, or a resin.

Referring to block 601, the process 600 can include forming a first mixture, including the first abrasive particles and the first bond and/or precursor bond material. The bond precursor material may include a powder material that may form the bond material of the finally-formed abrasive article. The bond precursor material can include an inorganic material. In an example, the bond precursor material can include a frit. In another example, the bond precursor material may include a ceramic material. As used herein, a reference to ceramic can include a composition including at least one metal element and at least one non-metal element. For example, a ceramic may include material such as oxides, carbides, nitrides, borides, and a combination thereof. More particularly, a ceramic material may have a vitreous phase, crystalline phase, polycrystalline phase, and a combination thereof.

In an embodiment, the bond precursor material can include an oxide-based composition, which may include some content of silica (i.e., silicon dioxide), boron oxide, alumina (i.e., aluminum oxide), zircon, sodium oxide, potassium oxide, iron oxide, titanium oxide, magnesium oxide, calcium oxide, and the like. In some instances, contents of components in the bond precursor material may be different from contents of components in the finally formed body of the abrasive article due to loss on ignition. For instance, the content of component in the precursor bond material may be calculated by using the formula $C = C_F(100\% - P_{LOI})$, wherein C is the content of a component in the bond precursor, CF is the content of the component in the finally-formed bonded abrasive body, and $P_{LOI}$ is loss of ignition. In further instances, the composition of the bond precursor material and the bond material of the finally-formed bonded abrasive body can be substantially the same (i.e., 5% or less difference in any one of the components between the precursor bond material and bond material of the finally formed body) or essentially the same (i.e., 1% or less difference in any one of the components between the precursor bond material and bond material of the finally formed body).

In an embodiment, the first bond/precursor bond material may include the ceramic particles.

The first mixture can optionally include one or more filler materials. The filler material may provide improved mechanical properties and facilitate the formation of the abrasive article.

The filler material can be distinct from the abrasive particles. For instance, the filler material may have a hardness less than a hardness of the abrasive particles. The filler material may also be distinct from compositions contained within bond precursor material. In at least one embodiment, the filler material can include various materials, such as fibers, woven materials, non-woven materials, particles, minerals, nuts, shells, oxides, alumina, carbide, nitrides, borides, organic materials, polymeric materials, naturally occurring materials, and a combination thereof. In particular instances, the filler material can include a material such as wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), cryolite, glass, glass fibers, titanates (e.g., potassium titanate fibers), zircon, rock wool, clay, sepiolite, an iron sulfide (e.g., $Fe_2S_3$, $FeS_2$, or a combination thereof), fluorspar ($CaF_2$), potassium sulfate ($K_2SO_4$), graphite, potassium fluoroborate ($KBF_4$), potassium aluminum fluoride ($KAlF_4$), zinc sulfide (ZnS), zinc borate, borax, boric acid, fine alundum powders, P15A, bubbled alumina, cork, glass spheres, silver, Saran™ resin, paradichlorobenzene, oxalic acid, alkali halides, organic halides, and attapulgite.

Formation of the first mixture can include forming a dry or wet mixture. It may be suitable to create a wet mixture to facilitate homogenous dispersion of the components within the mixture. A skilled artisan will appreciate that the first mixture can include other materials, including, for example, additives, binders, or any other materials known in the art to facilitate formation of a mixture to create a green product prior to formation of the abrasive article. In at least one embodiment, the mixture can be essentially free of a pore former. After forming the first mixture, the process 600 can continue to block 602, forming the first mixture into a peripheral region. The first mixture may be processed to form a green body of the peripheral region using techniques such as pressing, molding, casting, cutting, printing, curing, depositing, drying, heating, cooling, or any combination thereof. The green body can be treated subsequently to form a finally formed peripheral region.

The process 600 can further include forming a mixture including a bond and/or bond precursor material including a frit, vitrified material, ceramic material, or any combination thereof, a binder, and optionally a filler and/or abrasive particles for forming the central region. The mixture may be processed in a similar manner as discussed in relation to the first mixture to form a green body of the peripheral region 111.

In a particular embodiment, a green body of the first portion may be formed, including the green bodies of the peripheral region and central region abutting each other. In an example, one or more shaping devices may be used to facilitate the formation of the green body of the first portion. In a further instance, the process 600 may include forming the green body of the peripheral region and forming the green body of the core region simultaneously. In another example, pressing may be performed such that green bodies of the peripheral region and central region are formed and joined simultaneously. In a particular aspect, the process 600 may include pressing to form the green body of the first portion. In a particular example, pressing can include pressing the first mixture and pressing the mixture for the core simultaneously.

In a particular implementation, the first mixture may be poured into a first compartment of a shaping device, and the mixture for the core may be poured into a second compartment of the shaping device, wherein the first and second compartments may be separated by a removable metal ring. Pressing can be performed on both of the mixtures after removing the metal ring to form the green bodies of the peripheral region and the core region.

In another example, the green bodies of the peripheral region and central region may be formed separately and coupled by subsequent treatment to form a finally formed first portion. In still another aspect, the process 600 may include forming finally formed peripheral region and central region separately and coupling the finally formed regions.

The green body of the peripheral region, central region, or the first portion, including the peripheral region and the central region may be treated similarly. Some suitable examples of treating can include heating, curing, pressing, or a combination thereof. In some instances, a green body may be dried prior to heat treatment. A dryer may be used to facilitate drying.

An exemplary heating temperature can include at least 700° C., such as at least 750° C., at least 800° C., at least 850° C., or at least 875° C. In an instance, the heating temperature may be at most 1420° C., such as at most 1300° C., or at most 1250° C. In a further example, the heating temperature can be within a range, including any of the minimum and maximum values disclosed herein. In another example, the heating temperature can include the forming temperature of the first bond material. In a further example, the heating temperature may include the forming temperature of the central region. Heating may be performed for at least 2 hours to not greater than 200 hours.

In an embodiment, the vitrified bond material of the core and the first bond material may have a similar property, including melting temperature, forming temperature, wettability, viscosity, flowability, glass transition temperature, the like, or any combination thereof.

In a further embodiment, heating may include bonding the peripheral region to the core region. In a particular aspect, heating may include sintering the green body of the peripheral region and the green body of the core region to form sintered bodies. In a particular example, sintering the green body of the peripheral region and the green body of the core region may be performed at the same temperature. In another aspect, heating may include directly bonding the peripheral region to the core region. For example, heating may include forming a sinter-bond between the peripheral region and the core region. In an example, the first portion may be essentially free of an interface between the peripheral region and the core region. In another example, the first portion may include an interface between the peripheral region and the core region, including a composition including a portion of the first bond material and a portion of the vitrified material of the central region.

The process 600 may continue to form the first portion at block 603. In an aspect, the first portion can be formed after heating treating the green body of the first portion. In another aspect, an adhesive may be used to couple the finally formed peripheral region and central region to form the finally formed first portion.

The process 600 can include, at block 604, forming a second mixture including the second abrasive particles and second bond and/or precursor bond material. The second mixture may optionally include a filler material.

In an embodiment, the second mixture can include a precursor bond material including resins including epoxy resin, modified epoxy resins, epoxy-based resins, or any combination thereof. In an aspect, the resins may be non-crystalizing. In another aspect, the resins can have a certain viscosity that can facilitate improved formation of the abrasive article. Suitable viscosity can be from 5000 mPa·s to 50000 mPa·s. In a particular aspect, the epoxy resin may include bisphenole-F-epichlorohydrin resin, bisphenole-A-epichlorohydrin resin, or any combination thereof.

In a further embodiment, the precursor bond material can include one or more hardeners. An exemplary hardener may include amines, such as diamines or polyamines, polyamides, cyclic carboxylic acid anhydrides, or any combination thereof. A particular example may include aliphatic amines, such as diethylenetriamine, ethylene diamine; triethylenetetramine or 3,3',5-trimethylhexamethylenediamine, cycloaliphatic amines, such as 1,2-cyclohexyldiamine, isophoronediamine and its isomer mixtures or m-xylylenediamine; tetraethylenepentamine; 2-methyl-1,5-pentamethylenediamine; 1,6-hexamethylenediamine; 1,3-pentanediamine; (2-aminoethyl)-1,2-ethanediamine; 1,3-pentanediamine; aromatic amines such as methylenedianiline or 4,4-diaminodiphenylsulfone; modified amines, such as Mannich bases (for example diethylene triamine phenol Mannich base) or amine adducts of 3,3',5-trimethylhexamethylenediamine and bisphenol A diglycidyl ether.

The resins and hardener can be mixed in a ratio that can allow stoichiometric reaction and complete polymerization reaction to take place. When more than one hardener is used, the ratio between the hardeners can be adjusted to change a property (e.g., elasticity) of the second portion as desired by material removal operations.

In an embodiment, the second mixture can include an additive including a thickener to facilitate the formation of a uniform dispersion of the second mixture. A particular example of a thickener can include ultra-fine silica powder.

In a particular implementation, the resins and one or more hardeners may be premixed before solid components are added. The mixing ratio of the resins and one or more hardeners may be determined taking into consideration of the types and/or contents of functional groups of both the resins and one or more hardeners. While adding the solid components to the liquid premix of the precursor bond material, the mixture can be stirred with low shear force to help avoid the formation of and/or break agglomerates of abrasive particles and/or other fine particles. Solid components can be slowly added to the liquid mixture to reduce the formation of lumps or agglomerates. Stirring can continue after finishing adding all the solid components to the liquid to ensure the formation of a homogenous dispersion of fine particles and viscous precursor bond material. High shear force may be applied after all the solid components are added to the mixture.

The process 600 can continue to block 605 after forming the second mixture, which can include treating the second mixture to form the second portion. Treating can include shaping the second mixture in a suitable shaping apparatus, such as a mold having a desired shape. The second mixture can be slowly cast into the mold to help reduce or avoid trapped air that may result in spallings of the finally formed second portion. Treating can further include curing the second mixture at a proper temperature to form the organic bonded second portion. Selection of the curing temperature depends, for instance, on factors such as the type of bonding material employed, strength, hardness, and grinding performance desired. In an embodiment, cure can take place in the presence of heat. In at least one embodiment, curing temperature can be in the range including at least 120° C. to not greater than 250° C. In some instances, cure can take place at room temperature (from 20° C. to 25° C.) in the presence of a proper curing agent, such as utilizing amine or polyamino-amide hardeners to allow certain epoxy resins to cure at room temperature. In some other instances, light can be used to cure suitable resins. Cure can be performed for a period of time. For example, the second mixture can be held at a final cure temperature for a period of time, such as between 6 hours and 48 hours, between 10 and 24 hours, or until the mixture reaches the cross-linking temperature or desired density is obtained.

At block 606, the process 600 can include the formation of the body, including the first and second portions, by coupling the portions. In an embodiment, coupling may include applying an adhesive to the first portion, the second portion, or both to attach the first and second portions. In an example, a suitable adhesive can include a two-component epoxy adhesive having a dynamic viscosity of 200000 MPas, density of about 1.6 g/cm$^3$, and a vapor pressure of 0.1 hPa at 20° C. The adhesive was allowed up to 24 hours to cure. The body may be placed in a mold, and the first portion and the second portion may be centered with the aid of magnets.

In another embodiment, the process 600 may include profiling the peripheral surface or circumferential surface of the body to form threads, geometric features, certain roughness, or the like.

In an embodiment, the center apertures of the first and second portions 101 and 102 may be aligned such that the body can have a center aperture through the total thickness of the sub-assembly. In a particular embodiment, the first portion 101 and the second portion 102 can be formed such that the center apertures can have the same or similar diameters. In another embodiment, the first and second portions 101 and 102 may or may not have the same thickness. In an aspect, the first portion 101 may have a greater thickness than the second abrasive portion 102. In another aspect, the first and second portions 101 and 102 can have the same or similar thickness. In yet another embodiment, the first 101 and second portions 102 can have the same or similar perimeters.

After forming the body, the body may be incorporated into an abrasive article. It will be appreciated that the body may have any suitable size and shape as known in the art and can be incorporated into various types of abrasive articles to form an abrasive article suitable for conducting material removal operations.

In an embodiment, the body 100 can have an average burst speed of at least 65 m/s to allow the abrasive article to be suitable for applications requiring a higher grinding speed. For example, the body can have an average burst speed of at least 70 m/s, such as at least 75 m/s or at least 80 m/s or at least 85 m/s or at least 90 m/s or at least 95 m/s or at least 100 m/s or at least 110 m/s or at least 120 m/s or at least 130 m/s or at least 140 m/s or at least 150 m/s or at least 160 m/s or at least 170 m/s or at least 180 m/s. In another embodiment, the body may have a burst speed of at most 200 m/s or at most 180 m/s or at most 150 m/s. In a further embodiment, the abrasive article can include a body that has an average speed within a range, including any of the minimum and maximum values disclosed herein. For instance, the body can have an average burst speed in a range of at least 70 m/s and at most 200 m/s, such as in a range of at least 80 m/s and at most 180 m/s. Burst speed, as used herein, refers to the speed limit an abrasive article can reach prior to failure and is used to validate the maximum operational speed permitted by the Organization for the Safety of Abrasives for using the abrasive article. Burst speed is measured using the method published by the Organization for the Safety of Abrasives, which can be found at http://www.osa-abrasives.org/, and in accordance with EN 12413. The maximum operational speed of an abrasive article may vary between countries but can be converted from the burst speed following EN 12413. For example, in Europe (EU), conversion can be performed in accordance with EU ISO EN12413. In the EU, for an open machine operation, the burst speed of an abrasive article is √3 times the maximum operational speed; for a closed machine operation, the bust speed of an abrasive article is √0.75 times the maximum operational speed.

The abrasive articles of embodiments herein have notably improved performance. In at least one embodiment, the abrasive articles can have improved performance profile holding time, cycle time, power draw, G-Ratio, wear rate, profile retention, and/or material removal rate compared to a conventional counterpart abrasive article. Improved performance of abrasive articles of embodiments herein can be facilitated by one or more of the composition of the first and/or second bond material, particle sizes, shapes, and/or materials of the first and/or second abrasive particles, microstructures of the first and/or second portions, bonding between the first and second portions, bonding between the peripheral region and central region of the first portion, the composition and/or microstructure of the central region, and any combination thereof.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiments

Embodiment 1. An abrasive article comprising: a body including: a first portion comprising first abrasive particles contained within a first bond material including an inorganic material; a second portion comprising second abrasive particles contained within a second bond material comprising an organic material comprising epoxy; and a central opening extending in an axial direction of the body through the first portion and through the second portion, wherein: the central opening comprises a circumferential surface defining an inner diameter of the body, wherein the circumferential surface is defined by at least a portion of the first portion and at least a portion of the second portion; the second portion is coupled to the first portion in a radial plane; and the second portion comprises an elongation-at-fracture of less than 2.7%.

Embodiment 2. An abrasive article comprising: a body including: a first portion comprising first abrasive particles contained within a first bond material including an inorganic material; a second portion comprising second abrasive particles contained within a second bond material comprising an organic material comprising epoxy; and a central opening extending in an axial direction of the body through the first portion and through the second portion, wherein: the central opening comprises a circumferential surface defining an inner diameter of the body, wherein the circumferential surface is defined by at least a portion of the first portion and at least a portion of the second portion; the second portion is coupled to the first portion in a radial plane; and the second portion comprises a Stiffness Value of at least 8.3.

Embodiment 3. The abrasive article of any one of embodiments 1 to 2, wherein the organic material comprises: a storage modulus of greater than 3130 MPa at 25° C.; a storage modulus of greater than 2875 MPa at 50° C.; or any combination thereof.

Embodiment 4. The abrasive article of any one of embodiments 1 to 3, wherein the second abrasive particles comprise an average particle size $D_{50AP2}$ of at most 20 microns, at most 19 microns, at most 18 microns, at most 17 microns, at most 16 microns, at most 15 microns, at most 14 microns, at most 13 microns, at most 12 microns, at most 11 microns, at most 10 microns, at most 9 microns, at most 8 microns, at most 7 microns, at most 6 microns, or at most 5 microns.

Embodiment 5. The abrasive article of any one of embodiments 1 to 4, wherein the second abrasive particles comprise an average particle size $D_{50AP2}$ of at least 5 microns, at least 6 microns, at least 7 microns, at least 8 microns, at least 9 microns, at least 10 microns, or at least 11 microns.

Embodiment 6. The abrasive article of any one of embodiments 1 to 5, wherein the second portion comprises elongation-at-fracture of less than 2.7%, such as at most 2.6%, at most 2.5%, at most 2.4%, or at most 2.3%.

Embodiment 7. The abrasive article of any one of embodiments 1 to 6, wherein the second portion comprises elongation-at-fracture of at least 1.6%, at least 1.7, at least 1.8%, at least 1.9%, at least 2.0%, at least 2.1%, at least 2.2%, or at least 2.3%.

Embodiment 8. The abrasive article of any one of embodiments 1 to 7, wherein the second portion comprises Stiffness Value of at least 8.3, such as at least 8.5, at least 8.7, at least 8.8, at least 8.9, at least 9.0, at least 9.1, or at least 9.2.

Embodiment 9. The abrasive article of any one of embodiments 1 to 8, wherein the second portion comprises Stiffness Value of at most 20, at most 19, at most 18, at least 16, at most 14, at most 12, at most 10, or at most 9.5.

Embodiment 10. The abrasive article of any one of embodiments 1 to 9, wherein the second portion comprises Modulus of Rupture of at least 11 MPa, at least 13 MPa, at least 18 MPa, or at least 20 MPa.

Embodiment 11. The abrasive article of any one of embodiments 1 to 10, wherein the second portion comprises Modulus of Rupture of at most 38 MPa, at most 35 MPa, at most 33 MPa, at most 30 MPa, at most 28 MPa, or at most 23 MPa.

Embodiment 12. The abrasive article of any one of embodiments 1 to 11, wherein the first portion comprises a central region and a peripheral region coaxial with the central region, wherein the central region has a greater hardness than the peripheral region, a smaller porosity than the peripheral region, or a combination thereof.

Embodiment 13. The abrasive article of embodiment 12, wherein the peripheral region of the first portion comprises an abrasive portion comprising the first bond material and the first abrasive particles.

Embodiment 14. The abrasive article of embodiment 12 or 13, wherein the body comprises an outer peripheral surface defining an outer diameter of the body, wherein a first portion of the outer peripheral surface of the body is defined by an outer surface of the peripheral region of the first portion.

Embodiment 15. The abrasive article of any one of embodiments 12 to 14, wherein an inner surface of the central region of the first portion defines a first portion of the circumferential surface of the central opening, wherein the first portion of the circumferential surface of the central opening comprises an inorganic material different than the first bond material.

Embodiment 16. The abrasive article of any one of embodiments 12 to 15, wherein a second portion of the circumferential surface of the central opening is defined by an inner surface of the second portion, wherein the second portion of the circumferential surface comprises the second bond material, the second abrasive particles, or a combination thereof.

Embodiment 17. The abrasive article of any one of embodiments 12 to 14, wherein the central region of the first portion comprises the first bond material and wherein the first portion of the circumferential surface of the central opening comprises the first bond material.

Embodiment 18. The abrasive article of any one of embodiments 12 to 17, wherein the central region of the first portion comprises abrasive particles, wherein the first portion of the circumferential surface of the central opening comprises the same abrasive particles as the central region.

Embodiment 19. The abrasive article of any one of embodiments 12 to 17, wherein the central region of the first portion is essentially free of abrasive particles, wherein the first portion of the circumferential surface is essentially free of abrasive particles.

Embodiment 20. The abrasive article of any one of embodiments 1 to 19, wherein the radial plane extends through the circumferential surface of the central opening and an outer peripheral surface of the body.

Embodiment 21. The abrasive article of any one of embodiments 1 to 20, wherein a longitudinal axis extending in an axial direction of the body is perpendicular to the radial plane.

Embodiment 22. The abrasive article of any one of embodiments 1 to 21, wherein the first portion and the second portion of the body are only coupled in the radial plane.

Embodiment 23. The abrasive article of any one of embodiments 1 to 22, wherein the first portion and the second portion of the body are directly bonded to each other.

Embodiment 24. The abrasive article of any one of embodiments 1 to 23, wherein the first portion and the second portion of the body are bonded to each other via an adhesive, wherein the adhesive comprises epoxy, polyurethane, or any combination thereof.

Embodiment 25. The abrasive article of any one of embodiments 1 to 24, wherein an outer peripheral surface of the body comprises surface features including geometric features, threads, particular roughness, or any combination thereof, wherein the surface features are complementary to features of a workpiece.

Embodiment 26. The abrasive article of any one of embodiments 1 to 24, wherein a circumferential surface of the central opening comprises surface features including geometric features, threads, particular roughness, or any combination thereof, wherein the surface features are complementary to features of a workpiece.

Embodiment 27. The abrasive article of any one of embodiments 1 to 26, wherein the first bond material comprises a vitrified material.

Embodiment 28. The abrasive article of any one of embodiments 1 to 27, wherein the first abrasive particles comprise agglomerated abrasive particles, unagglomerated abrasive particles, shaped abrasive particles, non-shaped abrasive particles, or any combination thereof.

Embodiment 29. The abrasive article of any one of embodiments 1 to 28, wherein at least a portion of the first abrasive particles comprise shaped abrasive particles.

Embodiment 30. The abrasive article of any one of embodiments 1 to 29, wherein the first abrasive particles comprise elongated abrasive particles having an average aspect ratio of length to cross-sectional width of at least 2, at least 3, at least 4, or at least 5; or wherein the average aspect ratio is at most 20, at most 18, at most 15, at most 12, at most 10, or at most 8.

Embodiment 31. The abrasive article of any one of embodiments 1 to 30, wherein the first abrasive particles comprises a blend of abrasive particles, including elongated abrasive particles and granule abrasive particles.

Embodiment 32. The abrasive article of any one of embodiments 1 to 31, wherein the first abrasive particles comprise alumina including seeded gel alumina, fused alumina, sol-gel alumina, sol-gel sintered alumina, shaped and sintered alumina, or any combination thereof.

Embodiment 33. The abrasive article of any one of embodiments 1 to 32, wherein the second abrasive particles comprise a polycrystalline oxide material.

Embodiment 34. The abrasive article of any one of embodiments 1 to 33, wherein the second abrasive particles comprise an alumina-based material.

Embodiment 35. The abrasive article of any one of embodiments 1 to 34, wherein the second abrasive particles comprise seeded sol-gel alumina.

Embodiment 36. The abrasive article of any one of embodiments 1 to 35, wherein the second abrasive particles comprise a polycrystalline phase including alpha alumina having an average crystallite size of at most 1 micron, at most 0.5 microns, or at most 0.3 microns; or wherein the average crystallite size is at least 0.01 microns, at least 0.05 microns, at least 0.1 microns, at least 0.14 microns, or at least 0.18 microns.

Embodiment 37. The abrasive article of any one of embodiments 1 to 36, wherein the second portion comprises an additive comprising a material including silica, alumina, or any combination thereof, wherein the additive comprises an average particle size $D_{50F}$ of at most 5 microns, at most 2 microns, at most 1 micron, at most 800 nm, at most 500 nm, at most 300 nm, at most 200 nm, at most 100 nm, at most 90 nm, at most 80 nm, at most 60 nm, at most 40 nm, at most 30 nm, or at most 20 nm; or wherein the average particle size $D_{50F}$ is at least 5 nm, at least 7 nm, at least 9 nm, at least 10 nm, or at least 12 nm.

Embodiment 38. The abrasive article of embodiment 37, wherein the second abrasive particles comprise an average particle size $D_{50AP2}$, wherein a ratio of $D_{50AP2}:D_{50F}$ is at most 700, at most 600, or at most 500 or at most 450; or wherein the ratio of $D_{50AP2}:D_{50F}$ is at least 2, at least 5, at least 10, at least 50, at least 100, at least 200, at least 300, or at least 400.

Embodiment 39. The abrasive article of any one of embodiments 1 to 38, wherein the first portion of the body comprises a porosity of at least 5 vol %, at least 10 vol %, at least 20 vol %, or at least 30 vol % for a total volume of the first portion.

Embodiment 40. The abrasive article of any one of embodiments 1 to 39, wherein the first portion of the body comprises a porosity of at most 75 vol %, at most 70 vol %, at most 65 vol %, at most 60 vol %, or at most 55 vol % for a total volume of the first portion.

Embodiment 41. The abrasive article of any one of embodiments 1 to 40, wherein the first portion of the body comprises the bond material of at least 5 vol %, at least 10 vol %, at least 15 vol %, at least 20 vol %, at least 25 vol %, at least 30 vol %, or at least 35 vol % for a total volume of the first portion.

Embodiment 42. The abrasive article of any one of embodiments 1 to 41, wherein the first portion comprises the bond material of at most 60 vol %, at most 55 vol %, at most 50 vol %, at most 45 vol %, at most 40 vol %, at most 35 vol %, or at most 30 vol % for a total volume of the first portion.

Embodiment 43. The abrasive article of any one of embodiments 1 to 42, wherein the first portion comprises the first abrasive particles of at least 10 vol %, at least 15 vol %, at least 20 vol %, at least 30 vol %, at least 35 vol %, or at least 40 vol % or for a total volume of the first portion.

Embodiment 44. The abrasive article of any one of embodiments 1 to 43, wherein the first portion comprises the first abrasive particles of at most 65 vol %, at most 60 vol %, at most 55 vol %, or at most 50 vol % for a total volume of the first portion.

Embodiment 45. The abrasive article of any one of embodiments 1 to 44, wherein the second portion comprises a porosity of at least 3 vol %, at least 5 vol %, at least 8 vol %, at least 10 vol %, at least 15 vol %, at least 18 vol %, at least 20 vol %, at least 25 vol %, at least 30 vol %, at least 35 vol %, at least 38 vol %, at least 40 vol %, at least 43 vol %, or at least 45 vol % for a total volume of the second portion.

Embodiment 46. The abrasive article of any one of embodiments 1 to 45, wherein the second portion comprises a porosity of at most 60 vol %, at most 57 vol %, at most 55 vol %, at most 50 vol %, or at most 45 vol % for a total volume of the second portion.

Embodiment 47. The abrasive article of any one of embodiments 1 to 46, wherein the second portion comprises the bond material of at least 5 vol %, at least 10 vol %, at least 12 vol %, at least 15 vol %, at least 20 vol %, at least 25 vol %, at least 28 vol %, at least 30 vol %, or at least 35 vol % for a total volume of the second portion.

Embodiment 48. The abrasive article of any one of embodiments 1 to 47, wherein the second portion comprises the bond material of at most 55 vol %, at most 52 vol %, at most 50 vol %, at most 48 vol %, at most 45 vol %, at most 41 vol %, at most 38 vol %, at most 35 vol %, or at most 30 vol % for a total volume of the second portion.

Embodiment 49. The abrasive article of any one of embodiments 1 to 48, wherein the second portion comprises the second abrasive particles of at least 8 vol %, at least 10 vol %, at least 15 vol %, at least 20 vol %, at least 30 vol %, at least 35 vol %, or at least 40 vol % or for a total volume of the second portion.

Embodiment 50. The abrasive article of any one of embodiments 1 to 49, wherein the second portion comprises the second abrasive particles of at most 65 vol %, at most 60 vol %, at most 55 vol %, at most 50 vol %, at most 45 vol %, at most 40 vol %, at most 35 vol %, or at most 30 vol % for a total volume of the second portion.

Embodiment 51. The abrasive article of any one of embodiments 1 to 50, wherein the body comprises an average burst speed of at least 65 m/s, at least 70 m/s or at least 75 m/s or at least 80 m/s or at least 85 m/s or at least 90 m/s or at least 95 m/s or at least 100 m/s, or at least 110 m/s or at least 120 m/s or at least 130 m/s or at least 140 m/s or at least 150 m/s or at least 160 m/s or at least 170 m/s or at least 180 m/s.

Embodiment 52. The abrasive article of any one of embodiments 1 to 51, wherein the body comprises a burst speed of not greater than 200 m/s or not greater than 180 m/s or not greater than 150 m/s.

Embodiment 53. The abrasive article of any one of embodiments 1 to 52, wherein the second portion comprises an additive including silica, alumina, or any combination thereof, wherein the additive is in an amount of at least 0.05 wt % for the total weight of the second portion, at least 0.08 wt %, at least 0.1 wt %, at least 0.2 wt %, at least 0.3 wt %, at least 0.4 wt %, at least 0.5 wt %, at least 0.6 wt %, at least 0.7 wt %, or at least 0.8 wt %; or wherein the additive is in an amount of at most 15 wt %, at most 12 wt %, at most 10 wt %, at most 9 wt %, at most 8 wt %, at most 7 wt %, at most 5 wt %, or at most 2 wt %.

Embodiment 54. The abrasive article of any one of embodiments 1 to 53, wherein the second portion comprises a filler material in an amount of at most 20 wt % for the total weight of the second portion, at most 18 wt %, at most 15 wt %, at most 12 wt %, at most 9 wt %, or at most 6 wt %; or wherein the filler is in an amount of at least 1 wt %, at least 2 wt %, at least 3 wt %, at least 4 wt %, or at least 5 wt %.

EXAMPLES

Example 1

Abrasive samples representative of the second portions of embodiments herein were formed according to embodiments herein having the compositions noted in Table 1 below. The precursor bond material was prepared by mixing bisphenole-F-epichlorohydrin resins and bisphenole-A-epichlorohydrin resins with amine hardeners. The epoxy resins and hardeners were commercially available from Bakelite® AG. The abrasive particles, filler material, and ultra-fine silica powder having the average particle size of 12 nm were slowly, sequentially added to the precursor bond material while stirring the mixture at low shear force. Stirring was continued for 3 to 5 minutes after all the solid components were added or until a homogenous mixture was formed. High shear forces were applied after all the solid components were added. Ultra-fine silica is added to each mixture in a content from 0.1 wt % to 1 wt % for the total weight of the mixture. It is to be understood the approximate amount (rounded) of each component is included in this Example, and the total of the content of each component is 100%. The mixture was slowly cast into a mold to help avoid the formation of air bubbles and allowed to cure at room temperature.

MOR and elongation-at-fracture were tested using the 3-point bending test described in this disclosure. 4 to 9 samples were formed and tested for each composition to obtain the average elongation-at-fracture and MOR.

TABLE 1

| Samples | Abrasive particles | Bond | Abrasive particle materials/Grit sizes | Fillers (graphite) | Average elongation-at-fracture | Average MOR MPa |
| --- | --- | --- | --- | --- | --- | --- |
| S1 | 62 wt % | 38 wt % | White fused alumina/F150 | / | 1.8% | 35.1 |
| S2 | 61 wt % | 34 wt % | White fused alumina/F320 | 5 wt % | 1.4% | 13.9 |
| S3 | 55 wt % | 40 wt % | White fused alumina + seeded gel alumina/F800 | 5 wt % | 2.3% | 21.3 |

TABLE 1-continued

| Samples | Abrasive particles | Bond | Abrasive particle materials/Grit sizes | Fillers (graphite) | Average elongation-at-fracture | Average MOR MPa |
|---|---|---|---|---|---|---|
| S4 | 70 wt % | 30 wt % | White fused alumina/F800 | / | 1.8% | 21.1 |
| S5 | 49 wt % | 46 wt % | White fused alumina/F800 | 5 wt % | 2.4% | 31.9 |

Example 2

A set of 9 samples of Wheel Sample C6 having a polyurethane bond were tested for average elongation-at-fracture and MOR using the same 3-point bending test described in Example 1. Sample C6 includes approximately 40 wt % of the bond material. The average elongation-at-fracture and MOR of 9 samples was 2.7% and of 22.2 MPa, respectively.

Example 3

Figure 7A:
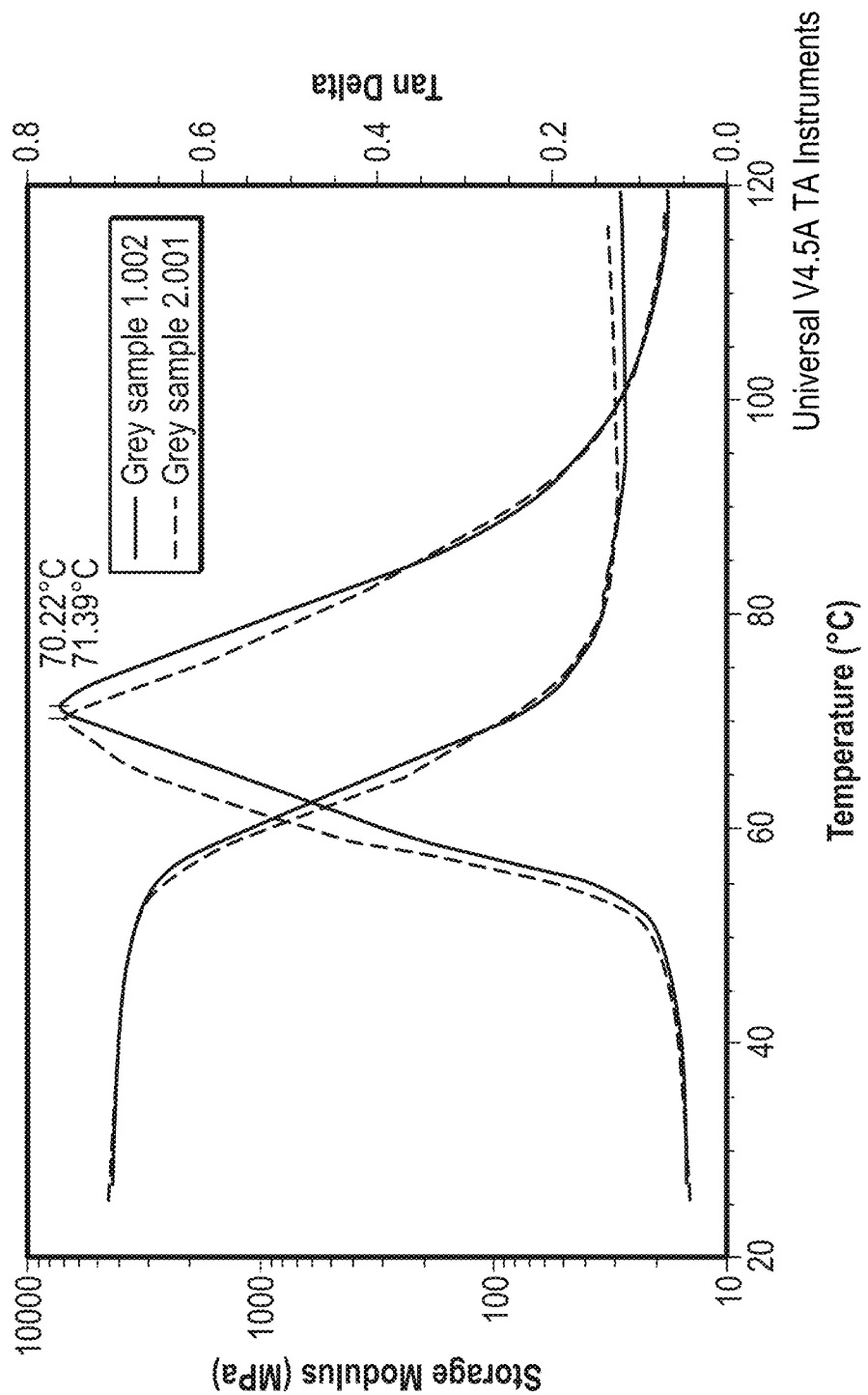
FIGS. 7A and 7B include plot illustrating storage modulus vs. temperature of abrasive samples.
Figure 7B:
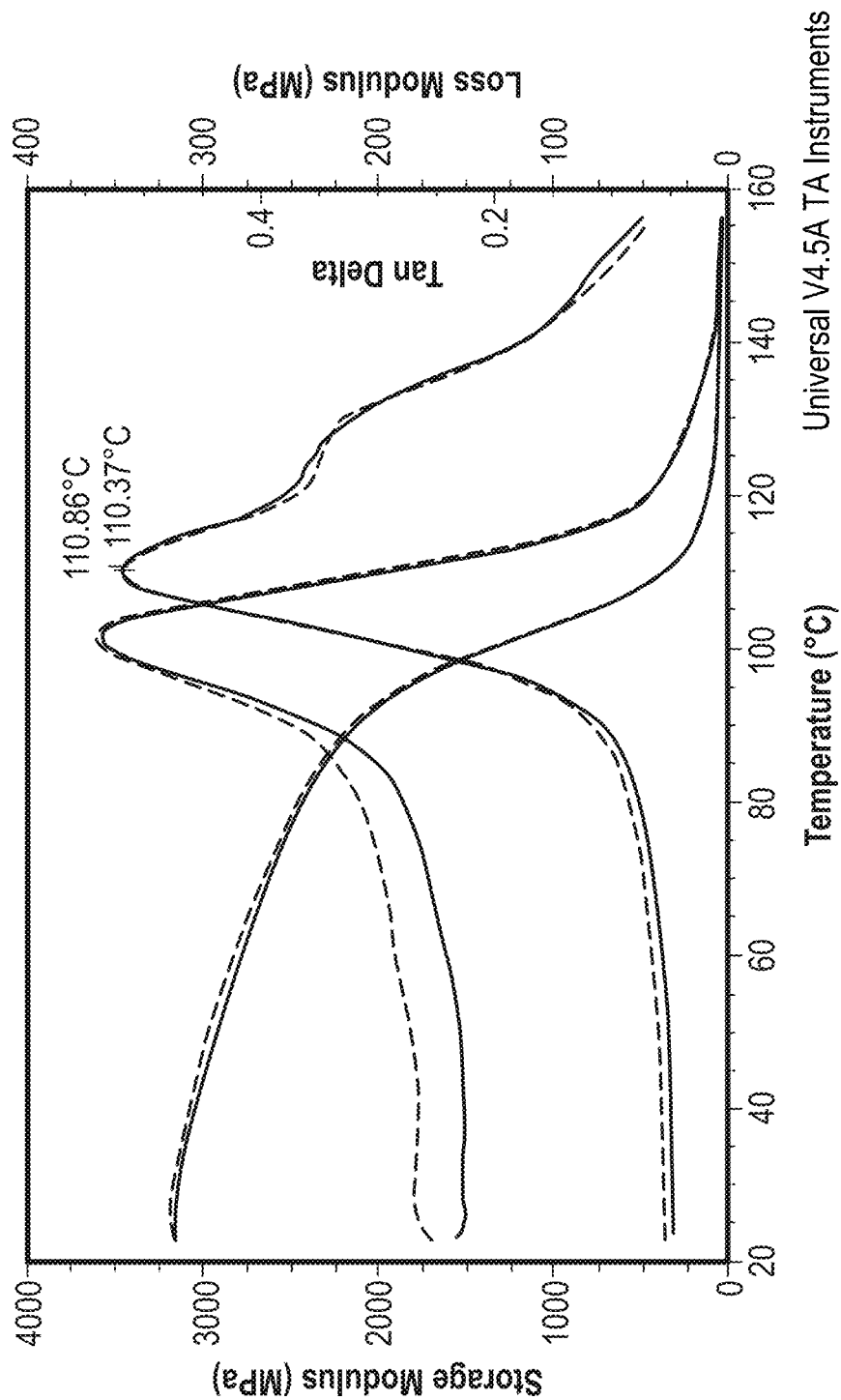

Sample S3 of Example 1 and Sample C6 of Example 2 were tested using Dynamic Mechanical Analysis. FIGS. 7A and 7B include plots of storage modulus vs. temperatures of Sample S3 of Example 1 and Sample C6 of Example 2, respectively. At 25° C. and 50° C., Sample S3 of Example 1 had a storage modulus of approximately 4500 and 3800 MPa, respectively, while Sample C6 of Example 2 had a storage modulus of 3130 and 2875 MPa, respectively.

Example 4

Figure 8:
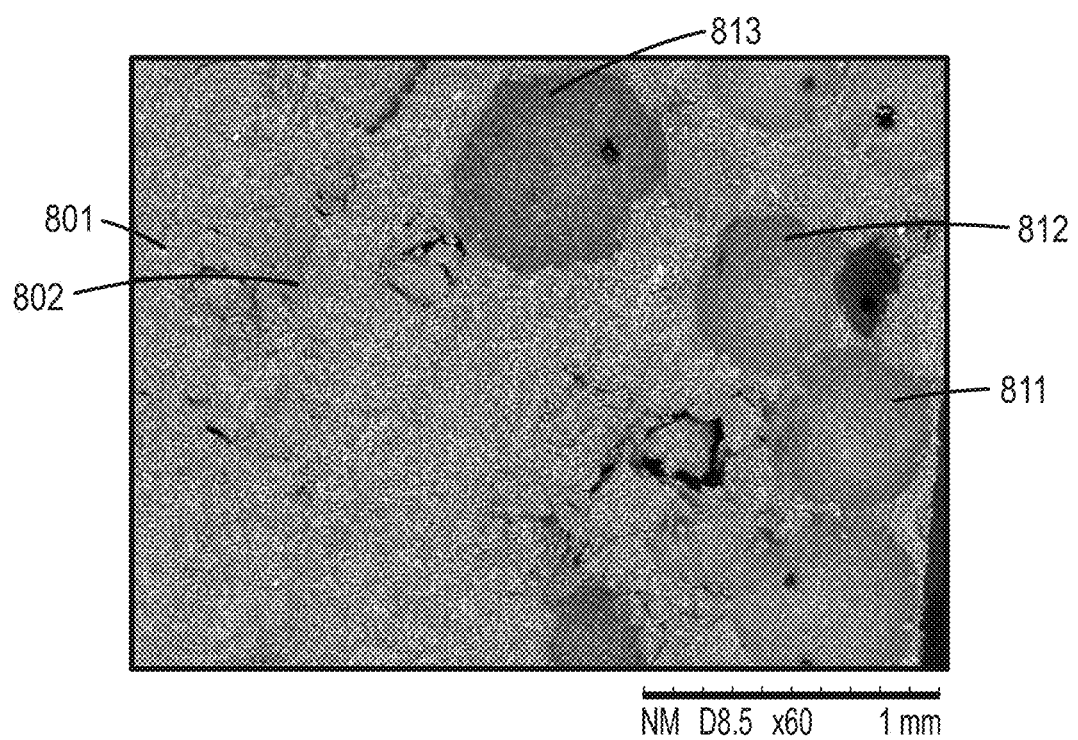
FIG. 8 includes a scanning electron microscope image of an abrasive sample.

Abrasive samples S8 and C7 were formed in the same manner as described in Example 1, except Sample C7 was formed without a thickening agent. The composition of Sample S8 is the same as Sample S3. The content of silica was replaced by the bond material for making Sample C7. Samples were examined under a scanning electron microscope, and an SEM image of the surface of Sample C7 is included in FIG. 8. Sample C7 includes the abrasive particles 801 and the bond material 802. It is noted Sample C7 includes areas 811 to 813 in which less abrasive particles are distributed, indicating sedimentation of the abrasive particles took place. Sample S8 demonstrated uniform distribution of abrasive particles.

Example 5

Dual grinding wheels S9 to S12 are formed according to embodiments herein.

The first portion of wheel Sample S9 includes a peripheral region including a vitrified bond of approximately 20 wt %, TQ grains of approximately 40 wt %, and fused alumina particles of approximately 30 wt %, and a pore former of approximately 10 wt % for the total weight of the peripheral region. TQ grains represent an example of elongated, seeded sol-gel alumina abrasive grains obtained from Saint-Gobain Abrasives in Worcester, Mass, and were used in forming all the samples.

The first portion of wheel Sample S10 includes a peripheral region including a vitrified bond of approximately 20 wt %, TQ grains of approximately 40 wt %, and fused alumina particles of approximately 30 wt %, and approximately 10 wt % of a pore former for the total weight of the peripheral region.

The first portion of wheel Sample S11 includes a peripheral region including a vitrified bond of approximately 15 wt %, TQ grains of approximately 35 wt %, and agglomerated fused alumina particles of approximately 65 wt %, for the total weight of the peripheral region.

The first portion of wheel Sample S12 includes a peripheral region including a vitrified bond of approximately 20 wt % and TQ grains of approximately 70 wt % for the total weight of the body and up to 10 wt % of a pore former for the total weight of the peripheral region.

The first portion of wheel Sample S13 includes a peripheral region including a vitrified bond of approximately 15 vol % and agglomerated ruby grains of approximately 85 vol % for the total volume of the peripheral region.

The vitrified bond composition of the peripheral regions of the wheel samples is included in Table 2 below. The average particle size of abrasive particles for the peripheral region of each wheel sample is approximately 100 microns.

The composition of the vitrified bond material of the central region of each wheel is similar and similar to the first vitrified bond composition included in Table 2. Each core region includes for the total weight of the core, approximately 80 wt % of fused alumina abrasive particles having an average particles size of 60 to 100 microns, and 20 wt % of a vitrified bond material.

The second portions of the wheel samples have the same composition as Sample S3.

The first portion has the dimension of 275×100×160 mm, and the second portion has the dimension of 220×60×160 mm. The first portion and the second portion are bonded using an epoxy adhesive.

TABLE 2

| Component | Contents (wt %) |
|---|---|
| $SiO_2$ | 45 to 58 |
| $Al_2O_3$ | 11 to 25 |
| $Fe_2O_3$ | Up to 0.5 |
| $TiO_2$ | Up to 2 |
| CaO | Up to 4 |
| MgO | Up to 7 |
| $Li_2O$ | Up to 4 |
| $Na_2O$ | 3 to 12 |
| $K_2O$ | up to 10 |
| $B_2O_3$ | 5 to 20 |

The dual grinding wheels are tested on grinding and polishing a 20MnCr5 workpiece. The dual grinding wheels are expected to perform better than a conventional dual grinding wheel counterpart.

Example 6

Additional abrasive samples were formed according to embodiments herein having the compositions noted in Table 3 below. The precursor bond material was prepared by mixing bisphenole-F-epichlorohydrin resins and bisphenole-A-epichlorohydrin resins with amine hardeners. The epoxy resins and hardeners were commercially available from Bakelite® AG. The abrasive particles, filler material, and ultra-fine silica powder having the average particle size of 12 nm were slowly, sequentially added to the precursor bond material while stirring the mixture at low shear force. Stirring was continued for 3 to 5 minutes after all the solid components were added or until a homogenous mixture was formed. High shear forces were applied after all the solid components were added. Ultra-fine silica is added to each mixture in a content from 0.1 wt % to 1 wt % for the total weight of the mixture. It is to be understood the approximate amount (rounded) of each component is included in this Example, and the total of the content of each component is 100%. The mixture was slowly cast into a mold to help avoid the formation of air bubbles and allowed to cure at room temperature.

TABLE 3

| Samples | Abrasive particles | Bond | Abrasive particle Materials/ Particle Sizes | Fillers (graphite) | CTE at 30-50° C. (ppm/° C.) | Polishing test |
|---|---|---|---|---|---|---|
| S11 | 49 ± 2 wt % | 46 ± 2 wt % | Fused alumina D50: 6-9 microns; D10: 1-3 microns; D90: 14-17 microns | 5 wt % | 52.51 | Satisfactory |
| S12 | 70 ± 2 wt % | 30 ± 2 wt % | Fused alumina D50: 84 microns | / | 37.31 | Failed |
| S13 | 60 ± 2 wt % | 30 ± 2 wt % | Fused alumina D50: 150 microns | 10 wt % | 33.54 | Failed |
| S14 | 55 ± 2 wt % | 40 ± 2 wt % | Sol-gel alumina D50: 5-8 microns; D10: 1-3 microns; D90: 64-67 microns | 5 wt % | 68.92 | Failed |
| S15 | 55 ± 2 wt % | 40 wt % | Sol-gel alumina D50: 6-9 microns; D10: 1-3 microns; D90: 14-17 microns | 5 wt % | 52.83 | Satisfactory |

Figure 9:
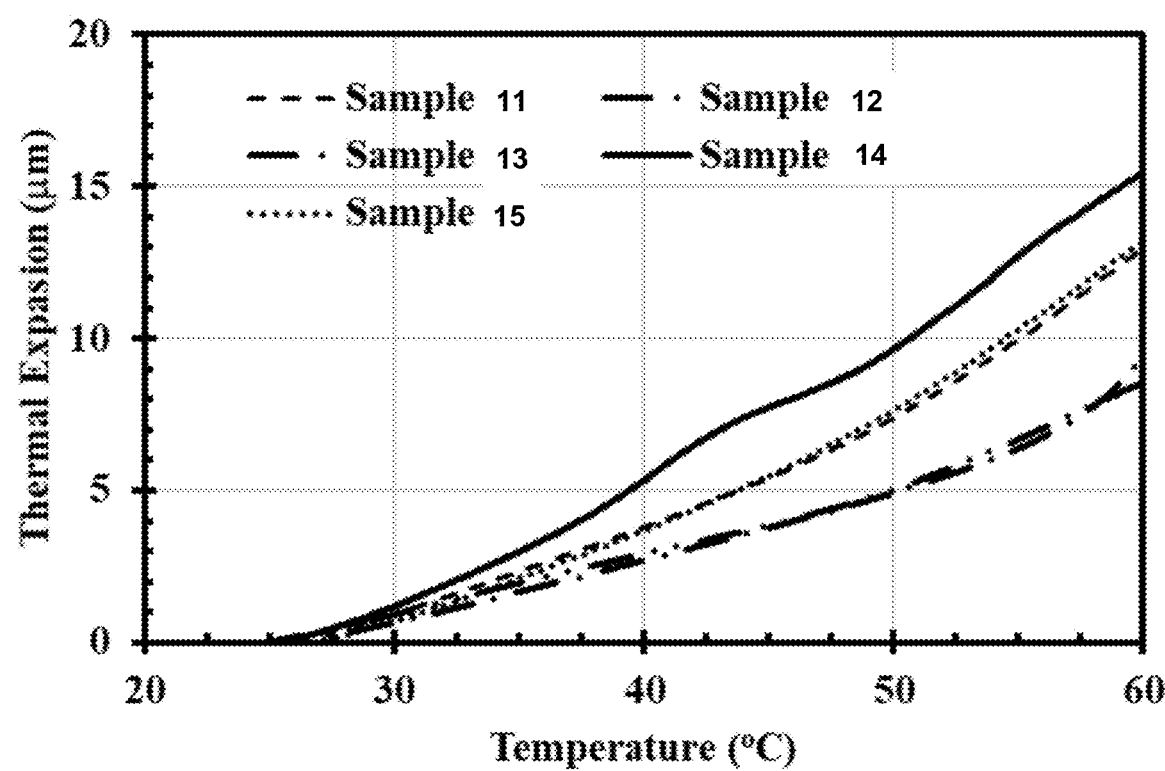
FIG. 9 includes an illustration of thermal expansion of abrasive samples.

Polishing tests of Samples S11 to S15 was conducted on 20MnCr5 workpieces. Coefficient of thermal expansion (CTE) of the samples were measured in accordance with embodiments herein. Thermal expansion of Samples S11 to S15 are illustrated in FIG. 9. Samples S11 and S15 demonstrated greater expansion compared to Samples S12 and S13 and reduced expansion compared to sample S14 over the temperature range from 30° C. to 50° C.

Example 7

Samples S1 to S5 are tested for coefficient of thermal expansion (CTE) in a temperature range from 30 to 50° C. The CTE of Samples S3 and S5 are expected to be similar to the CTE of sample 15. The CTE of Samples S1, S2, and S4 are expected to be adversely affected by the abrasive particle sizes, contents of the abrasive particles, or both, and less suitable for polishing applications compared to Samples S3, S5, S11, and S15. Polishing tests of samples S1 to S5 are performed on 20MnCr5 workpieces. Samples S3 and S5 are expected to have satisfactory performance and produce improved surface finish compared to samples S1, S2, and S4.

Benefits, other advantages, and solutions to problems have been described above with regard to specific embodiments. However, the benefits, advantages, solutions to problems and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include a range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive article comprising:
  a body including:
    a first portion comprising first abrasive particles contained within a first bond material including an inorganic material;
    a second portion comprising second abrasive particles contained within a second bond material comprising an organic material comprising epoxy, wherein the second abrasive particles comprise an average particle size $D_{50AP2}$ of at least 2 microns and at most 20 microns; and D10 of at least 0.5 microns and at most 4 microns or D90 of at least 9 microns and at most 34 microns or both; and a central opening extending in an axial direction of the body through the first portion and through the second portion, wherein:

the central opening comprises a circumferential surface defining an inner diameter of the body, wherein the circumferential surface is defined by at least a portion of the first portion and at least a portion of the second portion;

the second portion is coupled to the first portion in a radial plane; and the second portion comprises an elongation-at-fracture of less than 2.7%.

2. The abrasive article of claim 1, wherein the first portion of the body comprises for a total volume of the first portion:
a porosity of at least 5 vol % and at most 75 vol %;
the bond material of at least 5 vol % and at most 60 vol %; and
the first abrasive particles of at least 10 vol % and at most 65 vol %.

3. The abrasive article of claim 1, wherein the first portion comprises a central region and a peripheral region coaxial with the central region, wherein the central region has a greater hardness than the peripheral region, a smaller porosity than the peripheral region, or a combination thereof.

4. The abrasive article of claim 1, wherein the second abrasive particles are in a content of at least 37 wt % and at most 60 wt % for the total weight of the second portion.

5. The abrasive article of claim 1, wherein the second portion comprises a coefficient of thermal expansion of at least 38 ppm/° C. and at most 68 ppm/° C. in a temperature range of 30° C. to 50° C.

6. The abrasive article of claim 1, wherein the second portion comprises the elongation-at-fracture of less than 2.7% and at least 1.9%.

7. The abrasive article of claim 1, wherein the radial plane extends through the circumferential surface of the central opening and an outer peripheral surface of the body wherein a longitudinal axis extending in an axial direction of the body is perpendicular to the radial plane, and wherein the first portion and the second portion of the body are only coupled in the radial plane.

8. The abrasive article of claim 1, wherein the first bond material comprises a vitrified material.

9. The abrasive article of claim 1, wherein the first abrasive particles, the second abrasive particles, or both comprise alumina including seeded gel alumina, fused alumina, sol-gel alumina, sol-gel sintered alumina, shaped and sintered alumina, or any combination thereof.

10. An abrasive article comprising:
a body including:
a first portion comprising first abrasive particles contained within a first bond material including an inorganic material, wherein the first portion of the body comprises for a total volume of the first portion:
a porosity of at least 5 vol % and at most 75 vol %;
the bond material of at least 5 vol % and at most 60 vol %; and
the first abrasive particles of at least 10 vol % and at most 65 vol %;
a second portion comprising second abrasive particles contained within a second bond material comprising an organic material comprising epoxy; and
a central opening extending in an axial direction of the body through the first portion and through the second portion, wherein:

the central opening comprises a circumferential surface defining an inner diameter of the body, wherein the circumferential surface is defined by at least a portion of the first portion and at least a portion of the second portion;

the second portion is coupled to the first portion in a radial plane; and the second portion comprises a Stiffness Value of at least 8.3 wherein the second abrasive particles comprise an average particle size $D_{50AP2}$ of at least 2 microns and at most 30 microns.

11. The abrasive article of claim 10, wherein the organic material comprises:
a storage modulus of greater than 3130 MPa at 25° C.;
a storage modulus of greater than 2875 MPa at 50° C.; or
any combination thereof.

12. The abrasive article of claim 10, wherein the second abrasive particles comprise D10 of at least 0.5 microns and at most 4 microns, D90 of at least 9 microns and at most 34 microns, or both.

13. The abrasive article of claim 10, wherein the second portion comprises at least one of the following:
a coefficient of thermal expansion of at least 38 ppm/° C. and at most 68 ppm/° C. in a temperature range of 30° C. to 50° C.;
elongation-at-fracture of less than 2.7% and at least 1.6%;
Stiffness Value of at least 8.3 and at most 20;
Modulus of Rupture of at least 11 MPa and at most 38 MPa; or
any combination thereof.

14. The abrasive article of claim 10, wherein the second portion comprises:
a porosity of at least 3 vol % and at most 55 vol % for a total volume of the second portion;
the bond material of at least 29 wt % and at most 53 wt % for a total weight of the second portion; and
the second abrasive particles of at least 37 wt % and at most 60 wt % for the total weight of the second portion.

15. An abrasive article, comprising:
a body including:
a first portion comprising first abrasive particles contained within a first bond material including an inorganic material,
a second portion comprising second abrasive particles contained within a second bond material comprising an organic material comprising epoxy; and
a central opening extending in an axial direction of the body through the first portion and through the second portion, wherein:

the first portion comprises a central region and a peripheral region coaxial with the central region, wherein the central region has a greater hardness than the peripheral region, a smaller porosity than the peripheral region, or a combination thereof; and the central opening comprises a circumferential surface defining an inner diameter of the body, wherein the circumferential surface is defined by at least a portion of the first portion and at least a portion of the second portion, the second portion is coupled to the first portion in a radial Mane, and the second portion comprises a Stiffness Value of at least 8.3.

16. The abrasive article of claim 15, wherein the peripheral region of the first portion comprises an abrasive portion comprising the first bond material and the first abrasive particles.

17. The abrasive article of claim 15, wherein the body comprises an outer peripheral surface defining an outer diameter of the body, wherein a first portion of the outer peripheral surface of the body is defined by an outer surface of the peripheral region of the first portion.

18. The abrasive article of claim 15, wherein a second portion of the circumferential surface of the central opening is defined by an inner surface of the second portion, wherein the second portion of the circumferential surface comprises the second bond material, the second abrasive particles, or a combination thereof.

19. The abrasive article of claim 15, wherein the first portion of the body comprises for a total volume of the first portion:
   a porosity of at least 5 vol % and at most 75 vol %;
   the bond material of at least 5 vol % and at most 60 vol %; and
   the first abrasive particles of at least 10 vol % and at most 65 vol %.

20. The abrasive article of claim 10, wherein the second abrasive particles comprise an average particle size $D_{50AP2}$ of at last 2 microns and at most 20 microns.

* * * * *